US006472769B1

(12) United States Patent
Long, Jr. et al.

(10) Patent No.: US 6,472,769 B1
(45) Date of Patent: Oct. 29, 2002

(54) CAR CONTROL DEVICE ASSEMBLY

(75) Inventors: Abraham Long, Jr., Black River, NY (US); William B. McCurdy, Jr., Watertown, NY (US); Gary S. Newton, Adams, NY (US); Ronald O. Newton, Adams, NY (US); Steven R. Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 148 days.

(21) Appl. No.: 09/661,564

(22) Filed: Sep. 14, 2000

(51) Int. Cl.$^7$ .................................................. B60L 1/00
(52) U.S. Cl. ......................................... 307/9.1; 303/15
(58) Field of Search ................................ 307/9.1, 10.1; 303/15, 128

(56) References Cited

U.S. PATENT DOCUMENTS

| | | | |
|---|---|---|---|
| 4,137,983 A | * 2/1979 | Gray | 16/267 |
| 4,847,170 A | * 7/1989 | Martin | 429/1 |
| 5,906,505 A | 5/1999 | McCurdy et al. | |
| 5,947,446 A | * 9/1999 | Tinklepaugh | 251/214 |
| 5,967,465 A | 10/1999 | Lumbis et al. | |
| 5,967,620 A | 10/1999 | Truglio et al. | |
| 5,984,425 A | * 11/1999 | Orzal | 188/170 |
| 5,988,766 A | 11/1999 | McCurdy, Jr. | |
| 6,012,681 A | 1/2000 | Lumbis et al. | |
| 6,049,296 A | 4/2000 | Lumbis et al. | |
| 6,086,163 A | * 7/2000 | Klink et al. | 303/128 |
| 6,135,574 A | 10/2000 | Pettit et al. | |
| 6,318,812 B1 | * 11/2001 | Newton et al. | 303/15 |
| 6,375,277 B1 | 4/2002 | Carroll | |

FOREIGN PATENT DOCUMENTS

DK 196 23 845 A1 1/1997

OTHER PUBLICATIONS

Zeftron, Inc. Chameleon ECP Brake Summary, (no month) 1999. 6 pages.*
International Search Report; Mar. 8, 2002; PCT.

* cited by examiner

Primary Examiner—Brian Sircus
Assistant Examiner—Sharon Polk
(74) Attorney, Agent, or Firm—Barnes & Thornburg

(57) ABSTRACT

A car control device includes a pneumatic manifold with a plurality of fluid ports integrally formed in a housing. The configuration of the manifold and ports enables fluid communication with a brake valve, and a control valve module. The car control device also includes a functional control module in electric communication with a power management module, the control valve module, and the network. Each of the power management module, and the control valve module, the functional control module, and a battery assembly are all positioned to separately accessible within a housing.

61 Claims, 20 Drawing Sheets

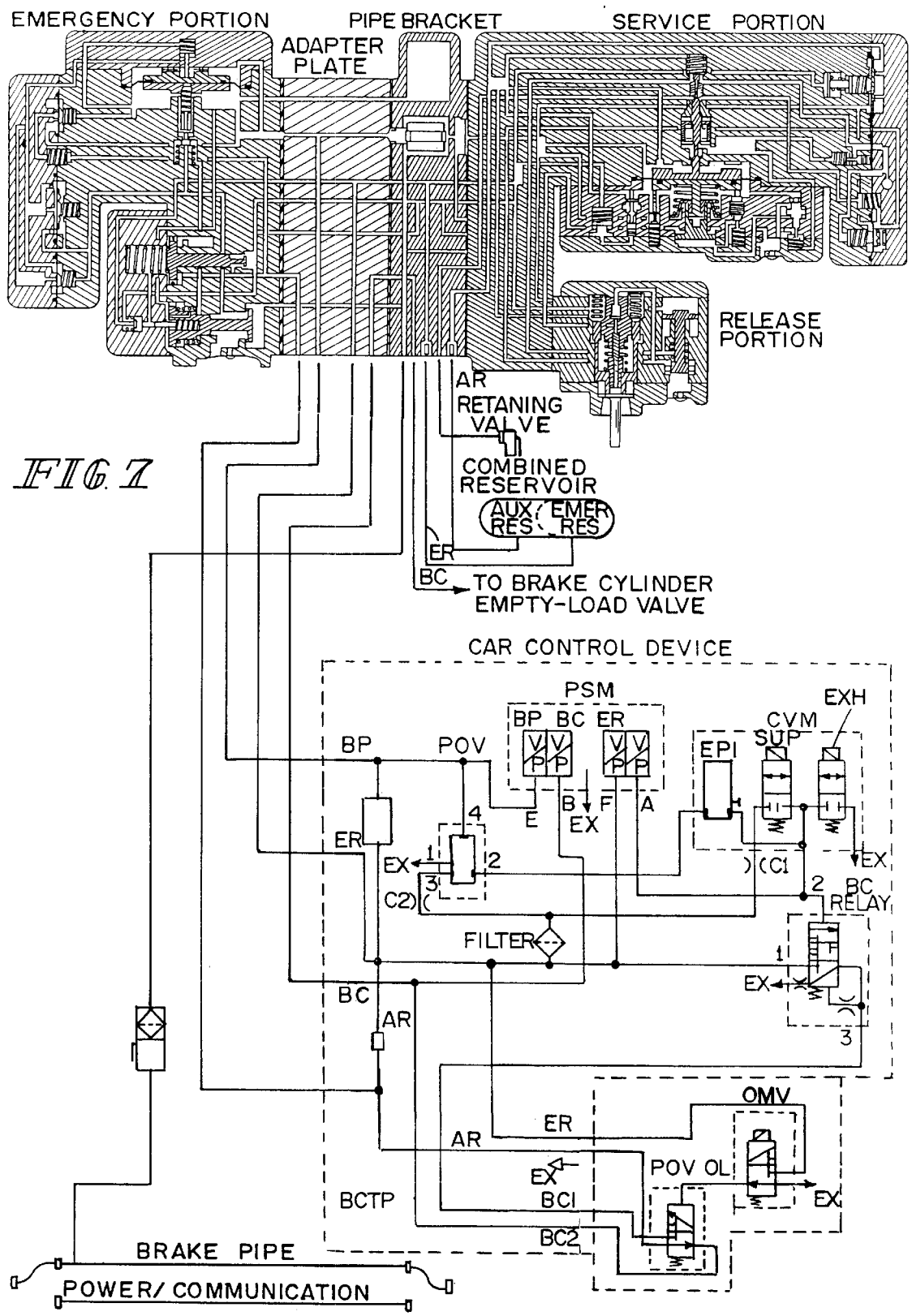

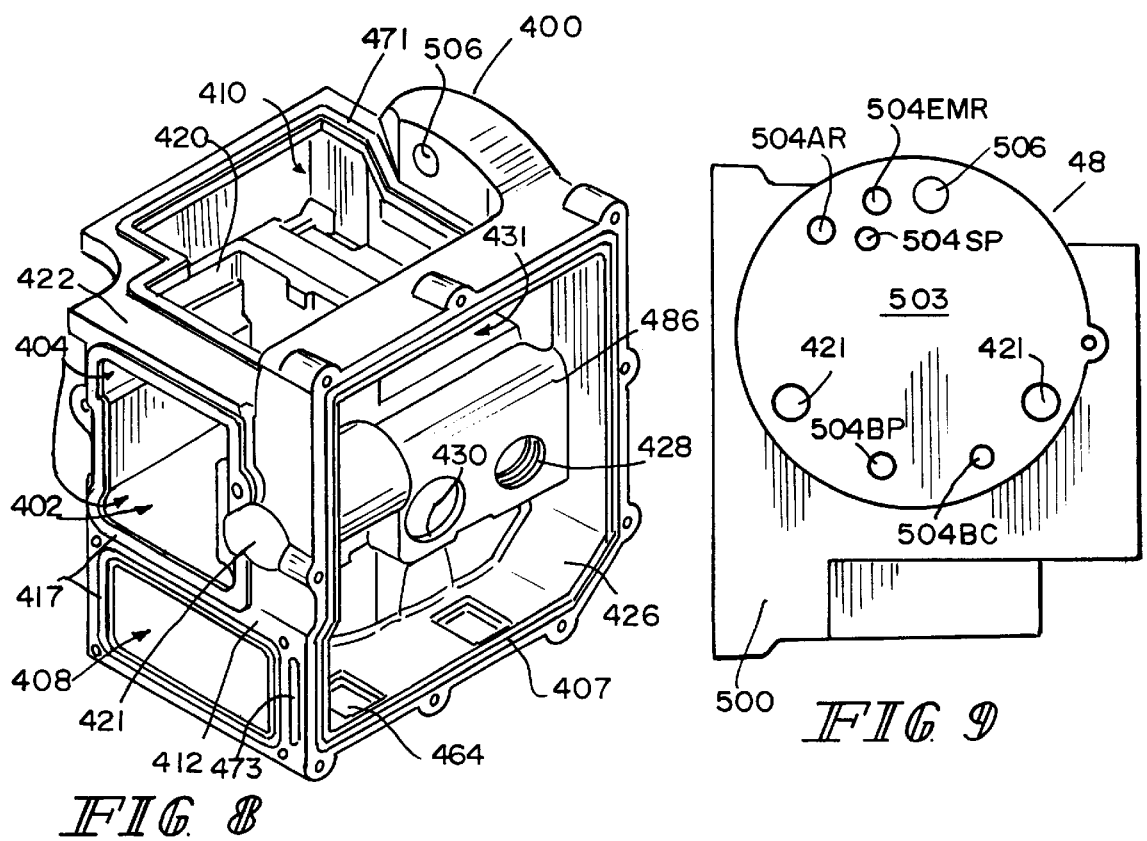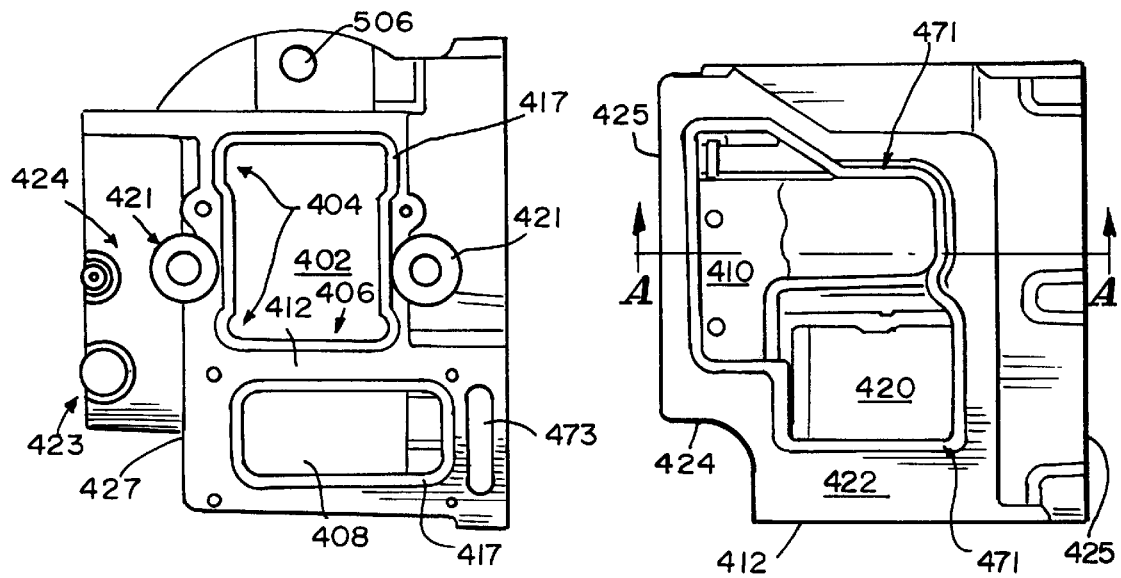

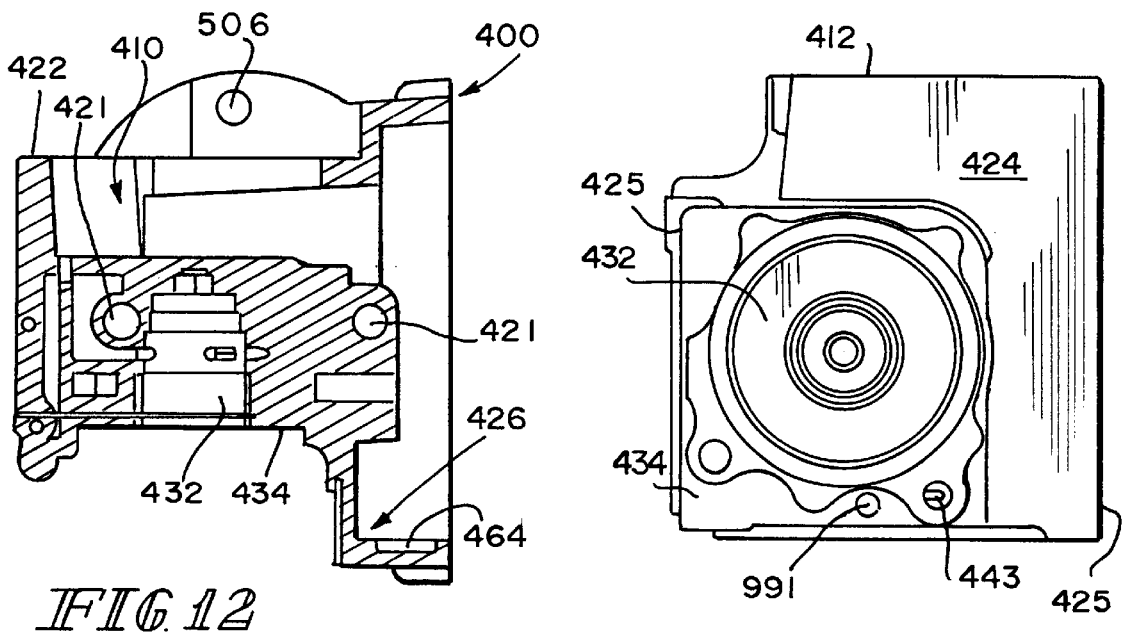
FIG. 12
FIG. 14
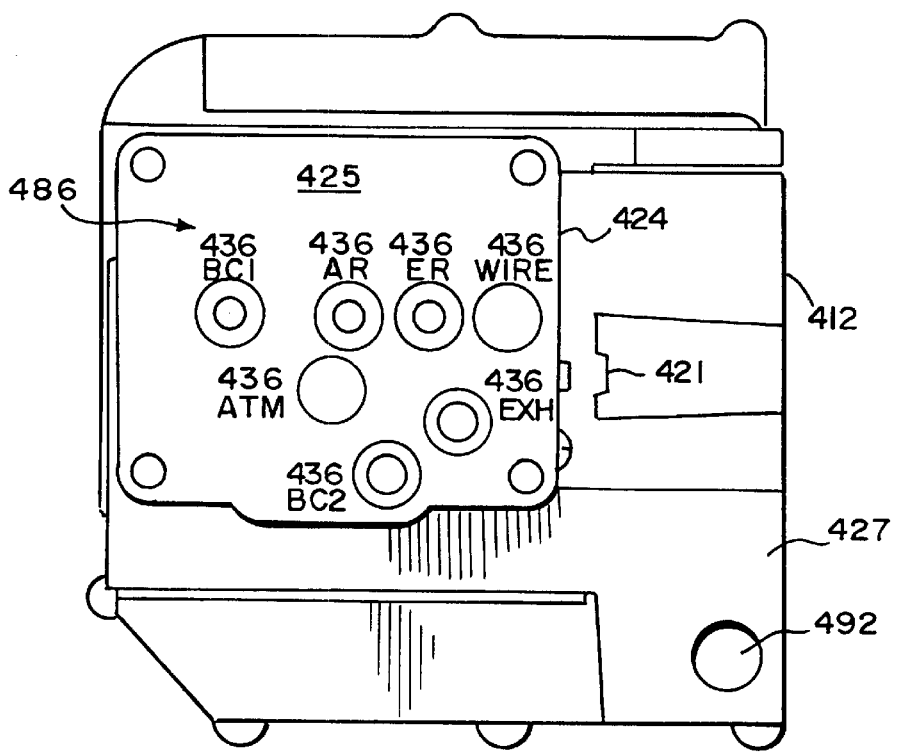
FIG. 13

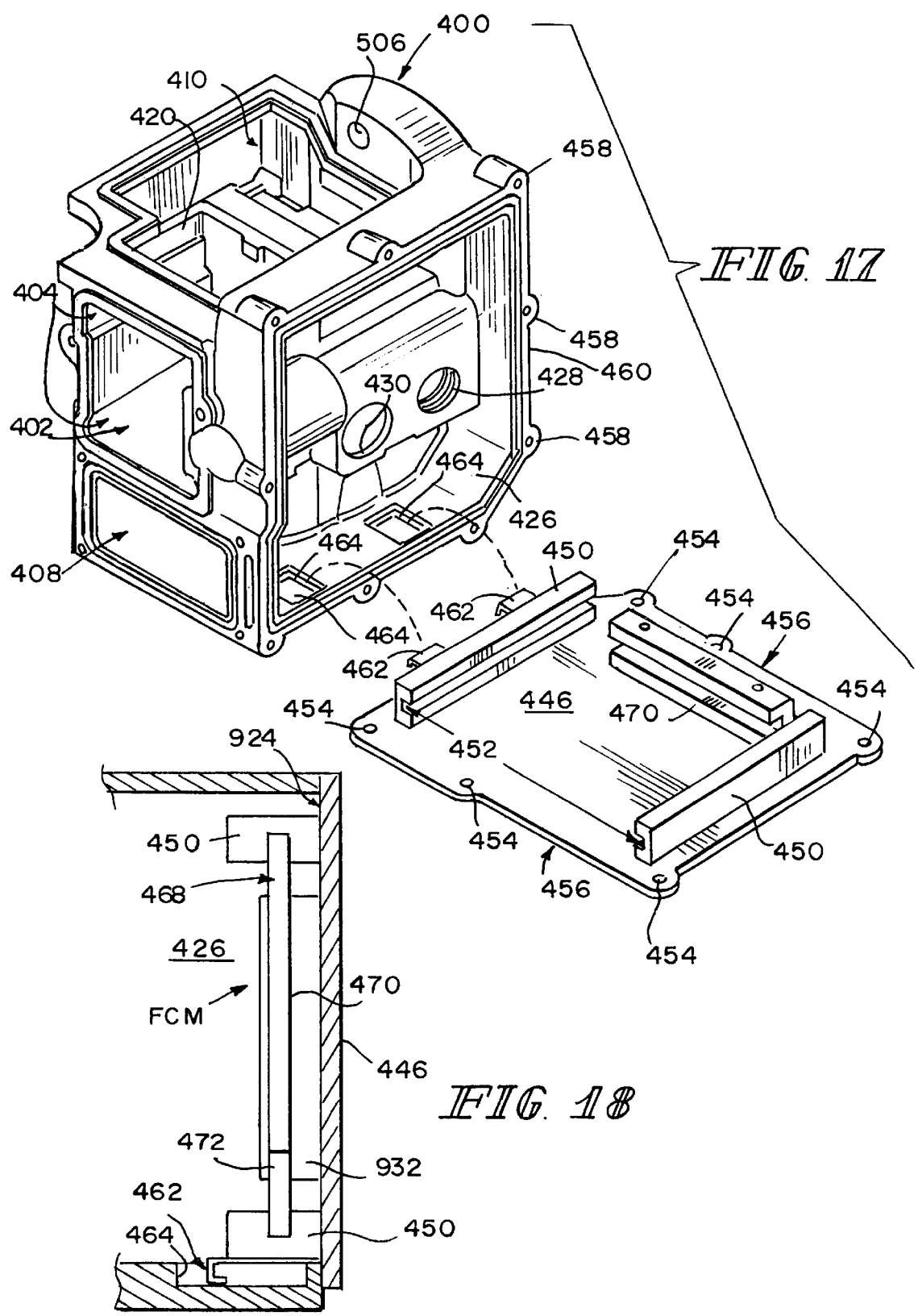

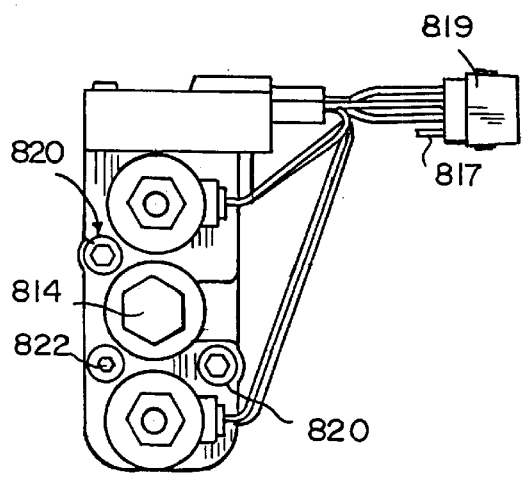
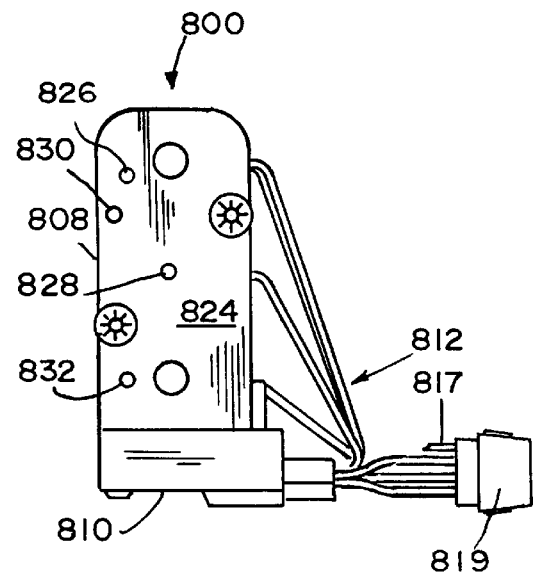
*FIG. 27*   *FIG. 28*
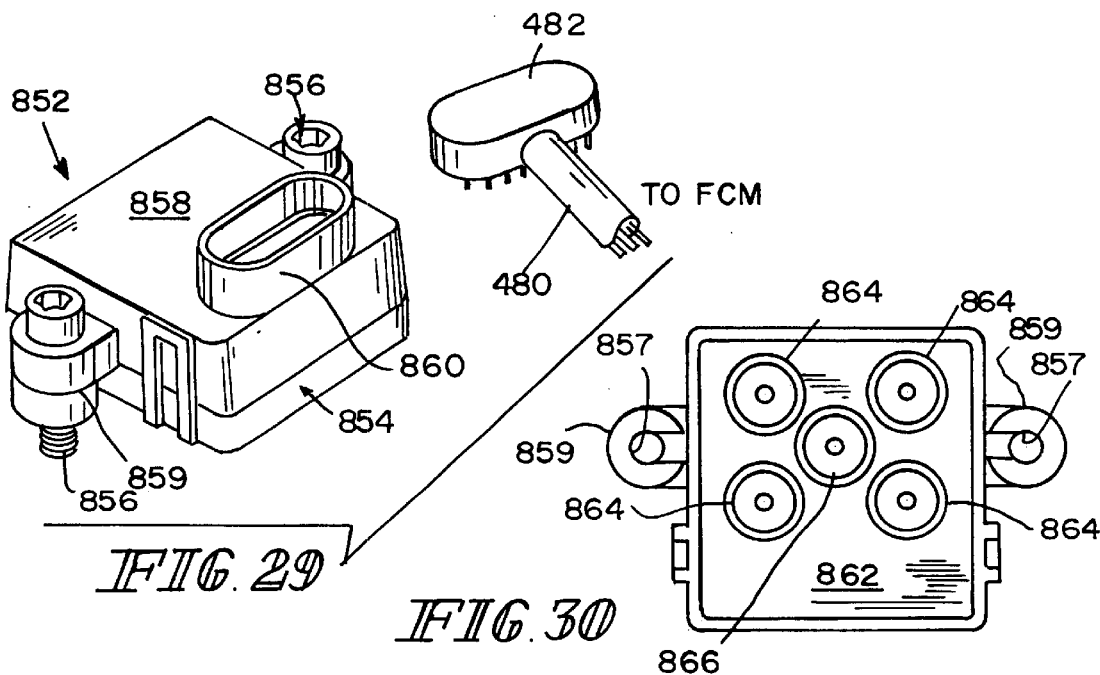
*FIG. 29*   *FIG. 30*

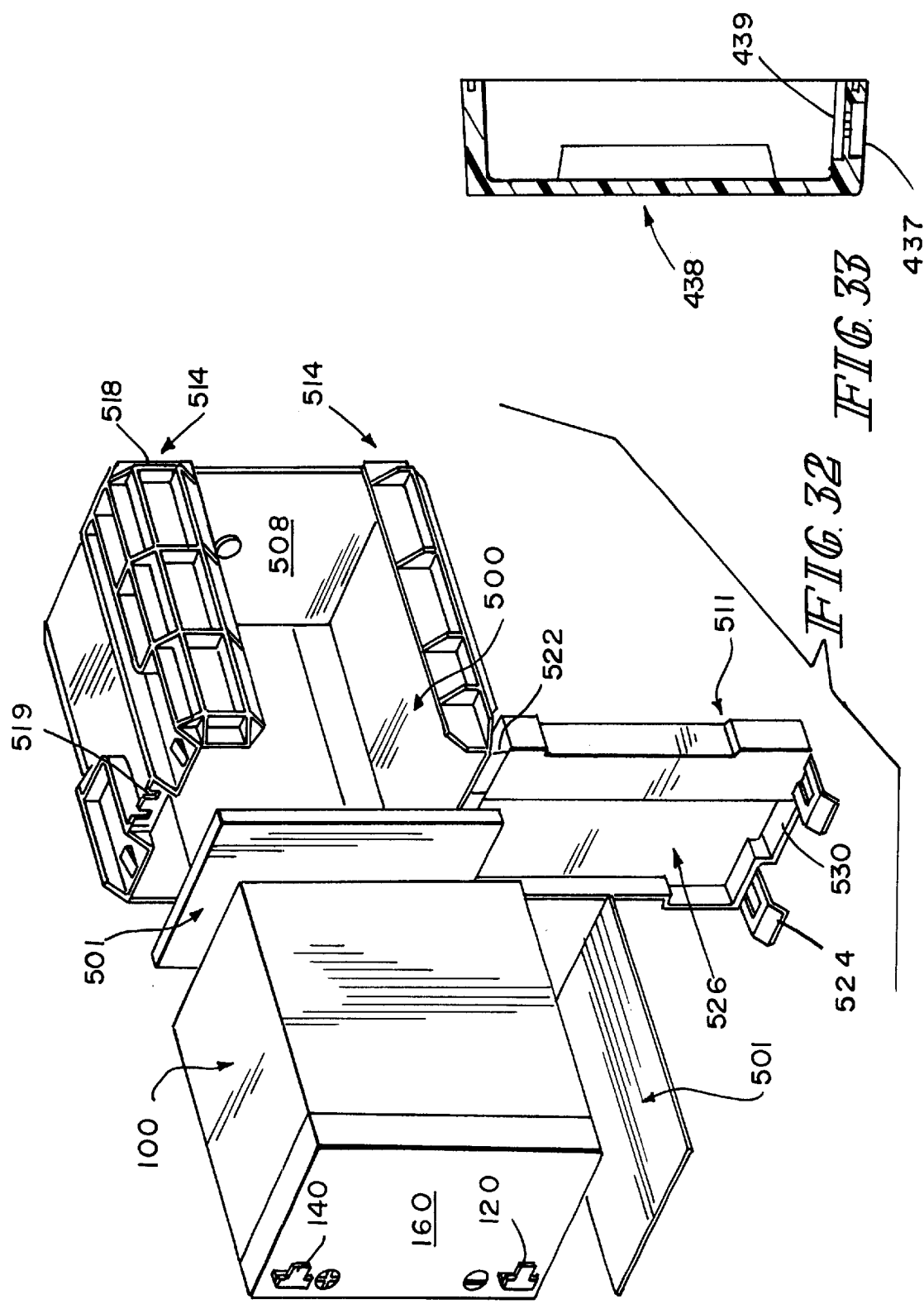

CAR CONTROL DEVICE ASSEMBLY

BACKGROUND OF THE INVENTION

The present invention relates generally to a car control device for use in a train and more specifically, to improvements in a car control device.

In general, a train is comprised of a consist of one or more locomotives followed by a series of cars, and a pneumatic brake pipe extending through the train for the pneumatic brake. In recent years, each of the train cars and each of the locomotives have been serially connected by a power and communication trainline. Additionally, each car has an electropneumatic brake system. The serial electric power network and the pneumatic brake network have been integrated to form an electropneumatic braking system which is in communication with the power and communication trainline, which not only delivers power to each of the cars but also provides a communication link, enabling identification and serialization of a train.

In order to integrate the pneumatic and electrical systems in a network, the prior art devised a car control device for placement in each car, and the car control device was then placed in contact with an ID module and the power and communication trainline. An example of a system is shown in U.S. Pat. No. 5,967,465 to Lumbis et al. and a car control device is disclosed in U.S. Pat. No. 5,967,670 to Truglio et al.

The construction of a car control device necessarily involved the linking and intertwining of several systems. The car control device comprised a control valve system, a power management system, a functional control system, and a manifold. The control valve system is comprised of a plurality of valves which may be electrically controlled in response to electrical signals received from the functional control module to pneumatically control the pneumatic brakes. A plurality of pressure transducers communicates with the functional control system.

The power management system, which is in electrical communication with the functional control module, typically comprises a battery and battery charger. The battery is charged by tapping into the high voltage power and communication trainline, which links all the cars in the network. Additionally, the power and communication trainline is in electric communication with the functional control module as well.

Therefore, a car control device involves an intricate network of systems in fluid and/or electrical communication with one another in a single housing. As shown in FIGS. 2 and 3, all of the systems are accessible through a single opening and cannot be easily serviced without removal of the manifold to which the systems are mounted.

Design objectives for the Car Control Device, as herein disclosed, include compliance with AAR Specifications compliance and a ten-fold increase in reliability.

The Reliability goals translate into requirements for:
§ subsystem reliability modeling and allocation
§ part count reduction
§ minimum electrical connections
§ engineered resonance response for each sub-component
§ component derating
§ design for circuit operation over worst case tolerance conditions
§ maximize availability and maintainability
§ and six-sigma validation Customer driven requirements include:
§ unitized electronic and pneumatic solution
§ mounting directly to the service side of the AB Pipe Bracket or SSPB
§ fits within the installation/removal envelope of the DB-10/ABDX Service Portion
§ upgrade-able from Overlay Application to Stand-Alone at low cost.
§ weight less than 44 lbs. (20 kg) for ease of handling.
§ status LEDs for troubleshooting The requirement for many integrated systems into a network, coupled with the need for increased reliability and customer demands, lead to a design philosophy embodied by "Mechatronics", which requires very tight integration of the mechanical and electronic elements. While previous design approaches for ECP CCDs divide the design along the lines of technology, that is a pneumatic module and a computer, the inventive car control device is designed as an integrated, synergistic whole. The approach has resulted in a significant improvement in reliability, size, weight, and parts count metrics.

SUMMARY OF THE INVENTION

The invention is a car control device for a car on an electric network of a train. The car control device communicates on the network, controls pneumatic brakes on the car and charges a battery, all in a housing of the car control device. The car control device has a pneumatic manifold with a plurality of ports enabling fluid communication with a brake valve, and a control valve module. A functional control module electrically communicates with a power management module, the control valve module, and the network, such that the functional control module, control valve module, power management module, and control valve module are interior the housing, which is preferably formed as a monolithic one-piece structure. The manifold is integrally formed into the housing.

The housing is configured such that each module is located within a compartment having a removable cover, which enables each of the modules and compartments to be separately accessible.

Battery Compartment

The battery compartment has top, bottom, back and side walls and a removable battery cover as a front wall. The Battery Cover is secured by two easily accessible bolts. To prevent loss during routine maintenance, both the bolts in the cover and the cover itself are retained. The walls of the battery compartment are configured to receive the battery in a predetermined orientation. A battery carriage with an internal configuration mating with the battery in the predetermined orientation and an external configuration mating with the walls of the battery compartment in the predetermined orientation provides further assurance that the battery cannot be inserted into the housing in a reversed orientation.

The carriage is configured to snugly envelope the battery and lie in the battery compartment. The front wall of the carriage is pivotally connected near a first edge and latched adjacent a second edge. Preferably, the top, bottom and side walls of the carriage are configured to form legs of a U-shape with the back wall of the carriage as a bight of the U-shape.

A battery connector with a positive socket and a negative socket attaches to positive and negative terminals of the battery, respectively. The front wall of the battery carriage includes a receiving chamber configured to receive the battery connector, such that the battery connector snugly fits into the receiving chamber.

Electrical leads extend from the top of the battery compartment to the top wall of the battery carriage. Wire clips are adjacent the top wall of the battery carriage and receive the electrical leads. In addition, the front wall of the carriage includes a guard on a top edge of the front wall.

The bottom wall, back wall, and two side walls of the battery compartment are integrally configured with the housing to form a monolithic, one-piece structure, and the top wall of the battery compartment is sealably mounted to the housing.

Each of the two side walls of the battery carriage comprise an upper flange extending from the top wall of the battery carriage, and a lower flange extending from the bottom wall of the battery carriage. At least one of the side walls of the battery carriage has ribs on a outer surface.

The battery compartment further comprises a pressure release valve, preferably an umbrella check valve, which allows gas to escape the housing in the event pressure inside the battery compartment elevates to a predetermined level.

Power Management Module

The power management module (PMM) is mounted in the housing and forms a top wall of a battery compartment. Battery leads extend from the battery compartment to the power management module. Source leads extend from the power management module exterior the battery compartment and are connected to the functional control module (FCM).

The power management module includes a housing, a circuit board mounted in the housing, and circuitry on the circuit board, wire, and grommets. In a preferred embodiment, the power management module further includes a battery charger. The battery and source leads attach to a surface of the circuit board of the power management module; additional leads extend from a surface of the circuit board to electrically connect to the functional control module. Preferably, the circuit board is potted on both sides.

A gasket may be placed between the power management module and the housing. The power management module comprises a frame for receipt of the circuit board. Tabs are formed on the frame and edges of the circuit board. The circuit board and the frame are cooperatively configured so that the circuit board fits tightly into the frame.

Functional Control Module

The functional control module (FCM) is mounted on an interior surface of the cover. A functional control module compartment is integrally configured on a face of the housing. The cover removably conceals the functional control module compartment, and the functional control module lies in the functional control module compartment. The functional control module comprises circuitry which interprets trainline communications signals, provides brake control signals to a control valve module, and provides control to a power management module, which charges the battery.

The functional control module comprises a circuit board mounted adjacent to the interior surface of the cover. First electrical leads electrically connect the circuit board to the power management module, the control valve module and the pressure sensor module. Second electric leads electrically connect the circuit board to plugs on the housing; the plugs removably receive leads connected to the network.

A pair of parallel, spaced apart, groove members are attached to the interior surface of the cover, thereby forming a channel to receive edges of the functional control module circuit board. These spaced apart, groove members maybe cast into the interior surface as well. A locking device secures the circuit board in the channel formed by the groove members. An edge connector mates with an edge of the circuit board. A respective electrical lead extends from the edge connector to contact each of the power management module, pressure sensor module, and the control valve module. Additionally, electrical leads extend from the edge connector to the plugs, which allow removable connection to the network.

The edge connector is mounted on the interior surface of the cover and positioned such that as the circuit board is inserted into the channel, the edge connector provides a stop to electrically engage the circuit board. The functional control module compartment cover is configured to cooperate with the housing to support the cover on the housing in an open position of the cover. In a preferred embodiment, at least one support member is mounted on the cover, such that each support member extends into the housing when the functional control module cover is in a closed position, and engages a respective recess in the housing when the functional control module cover is moved to the open position. In the open position, a plurality of fluid ports on the manifold become accessible within the functional control module compartment.

Each support member lies within the recess when the functional control module cover is in the closed position; in a preferred embodiment, the support members are mounted on a groove member. Connectors such as threaded bolts secure the cover of the functional control module to the housing.

Control Valve Module

The control valve module has supply and exhaust valves on a sub-manifold as well as an electric connecting block. The supply and exhaust valves are electrically connected to the connector block, and the connector block is connected to the functional control module. The submanifold is mounted on the manifold, and the control valve module is in fluid communication with the brake valve or manifold, which will be described later, and electric communication with the functional control module.

The housing is configured such that the control valve module compartment is adjacent to the power management module compartment in the housing. A control valve module compartment is integrally configured on a face of the housing, and a common cover on the housing provides access to both the power management module compartment and the control valve module compartment.

The sub-manifold includes ports for the supply valve, the exhaust valve, and an isolation valve; and the supply valve and the exhaust valve are mounted in the supply valve and the exhaust valve ports, respectively. The isolation valve is mounted in the isolation valve port in a stand alone configuration of the car control device and is removed for an overlay configuration of the car control device. The isolation valve is electrically connected to the connector block.

Electrical leads connect each of a respective supply valve and the exhaust valve to the connector block. A multi-lead wiring harness connects the connector block to the functional control module.

A pair of jumper wires are electrically connected to the electrical connector block when the car control device is in an overlay configuration. Additionally, the car control device further comprises detection software which determines whether the car control device is operating in the overlay configuration or alternatively in the stand-alone configuration.

Pressure Sensor Module

A pressure sensor module (PSM) is mounted in the housing within a pressure sensor module compartment and in fluid communication with the manifold. The pressure sensor module (PSM) is in electric communication with the functional control module, which mates with the circuit board of the functional control module via the edge connector. Preferably, the pressure sensor module is mounted inside the housing adjacent to the control valve module and the power management module.

The pressure sensor module further comprises a casing and a plurality of pneumatic input ports integrally configured on a first face of the casing and in fluid communication with the manifold, as described earlier. The ports are configured so that mounting of the module of the pressure sensor module to the housing sealably connects each of the pneumatic input ports to an aperture in fluid communication with the manifold. Preferably, the casing is sealed except for the ports. A plurality of transducers are inside the casing and in communication with its own port. Each of the transducers is electrically connected to the functional control module.

The pneumatic input ports of the pressure sensor module are connected respectively to receive fluid communication from a reservoir, a brake pipe, a brake cylinder and control valve pressure and an atmospheric reference. The pressure at each of the emergency reservoir, brake pipe, brake cylinder and control valve pressure ports is compared to the reference, then translated into a voltage by the respective pressure transducers, thereby producing a signal from the transducers that is proportional to a gauge pressure for each of the respective ports. The casing comprises at least one bore for receipt of a fastener which attaches the casing to the housing.

The pressure sensor module has a multi-pin electrical receptacle on a second face of the casing. The receptacle is configured such that each of the transducers has an output electrically connected to a respective pin. Additionally, a pair of pins of the receptacle correspond to a pair of common voltage inputs to each of the transducers. A cable configured to mate with the receptacle on the first end electrically contacts the functional control module at a second end, preferably by making electrical contact with an electrical edge connector.

The pressure sensor module further comprises an ambient input port in fluid communication with the external atmosphere. The ambient input port is connected to a conduit that extends through the housing to provide direct fluid communication with atmospheric pressure.

Overlay Module

A plurality of adjacent ports on an exterior of a wall of the housing mates with a standard release portion of a pneumatic brake control valve. A release portion of a pneumatic brake control valve is mounted at the exterior wall and mates with the adjacent ports in a stand alone configuration of the car control device. An overlay module is mounted at the exterior wall and mates with the adjacent ports in an overlay configuration of the car control device.

The overlay module includes an electropneumatic valve electrically connected, through the control valve module, to the functional control module and pneumatically connected to the brake control valve. The electropneumatic valve selectively connects the pneumatic brake control valve or the car control device to control a brake cylinder.

The overlay module includes an electropneumatic valve and a pneumatic valve. The electropneumatic valve receives control signals to selectively connect a reservoir or exhaust to control the pneumatic valve. The pneumatic valve connects the brake control valve to the brake cylinder in response to exhaust and connects the car control device to the brake cylinder in response to reservoir pressure.

The back face of the housing, which includes a generally circular interface having a plurality of ports and apertures therein, is formed to mate with a pipe bracket. In addition to having ports to mate with the pipe bracket, a special conversion port is also included on the pipe bracket interface.

A pair of special plugs is configured to fit within the special conversion port. The manifold is formed so that the conduit leading to the emergency reservoir is connectable with the conduit leading to the auxiliary reservoir. In the overlay configuration, special overlay plug prevents fluid communication between the emergency reservoir and the auxiliary reservoir. In contrast, a special stand-alone plug may be inserted into the special conversion port in order to allow fluid communication between the auxiliary reservoir and the emergency reservoir.

Brake Cylinder Valve

A brake cylinder valve port, which is generally known in the art as a brake cylinder relay bore, is integrally configured on one face of the housing. In a preferred embodiment, the brake cylinder relay bore is on a bottom face of the housing.

Other objects, advantages and novel features of the present invention will become apparent from the following detailed description of the invention when considered in conjunction with the accompanying drawings.

BRIEF DESCRIPTION OF THE DRAWINGS

FIG. 7 is a pneumatic diagram of the invention in the overlay configuration.

FIG. 8 is a perspective view of the multi-compartment car control device housing.

FIG. 9 is a back view of the multi-compartment car control device.

FIG. 10 is a front view of the multi-compartment car control device.

FIG. 11 is a plan view of the multi-compartment car control device.

FIG. 12 is a cross section view of the multi-compartment car control device, viewed from plane A—A shown on FIG. 11.

FIG. 13 is a side view of the multi-compartment car control device, depicting the overlay module assembly face.

FIG. 14 is a bottom view of the multi-compartment car control device.

FIG. 17 is a perspective view of the multi-compartment car control device showing the functional control module compartment, without the circuit board installed, and with the cover in the open position.

FIG. 18 is a side view of the functional control module compartment, with the circuit board installed, and with the cover in the closed position.

FIG. 27 is a plan view of the control valve module submanifold in the overlay configuration.

FIG. 28 is the bottom view of the control valve module submanifold in the stand-alone configuration.

FIG. 29 is a perspective view of the pressure sensor module.

FIG. 30 shows a bottom view of the pressure sensor module.

FIGS. 32 is a perspective view of the battery and battery carriage.

FIG. 33 depicts a cross section view of the battery compartment cover, viewed from plane BB shown on FIG. 15.

DETAILED DESCRIPTION OF THE PREFERRED EMBODIMENTS

Figure 1:
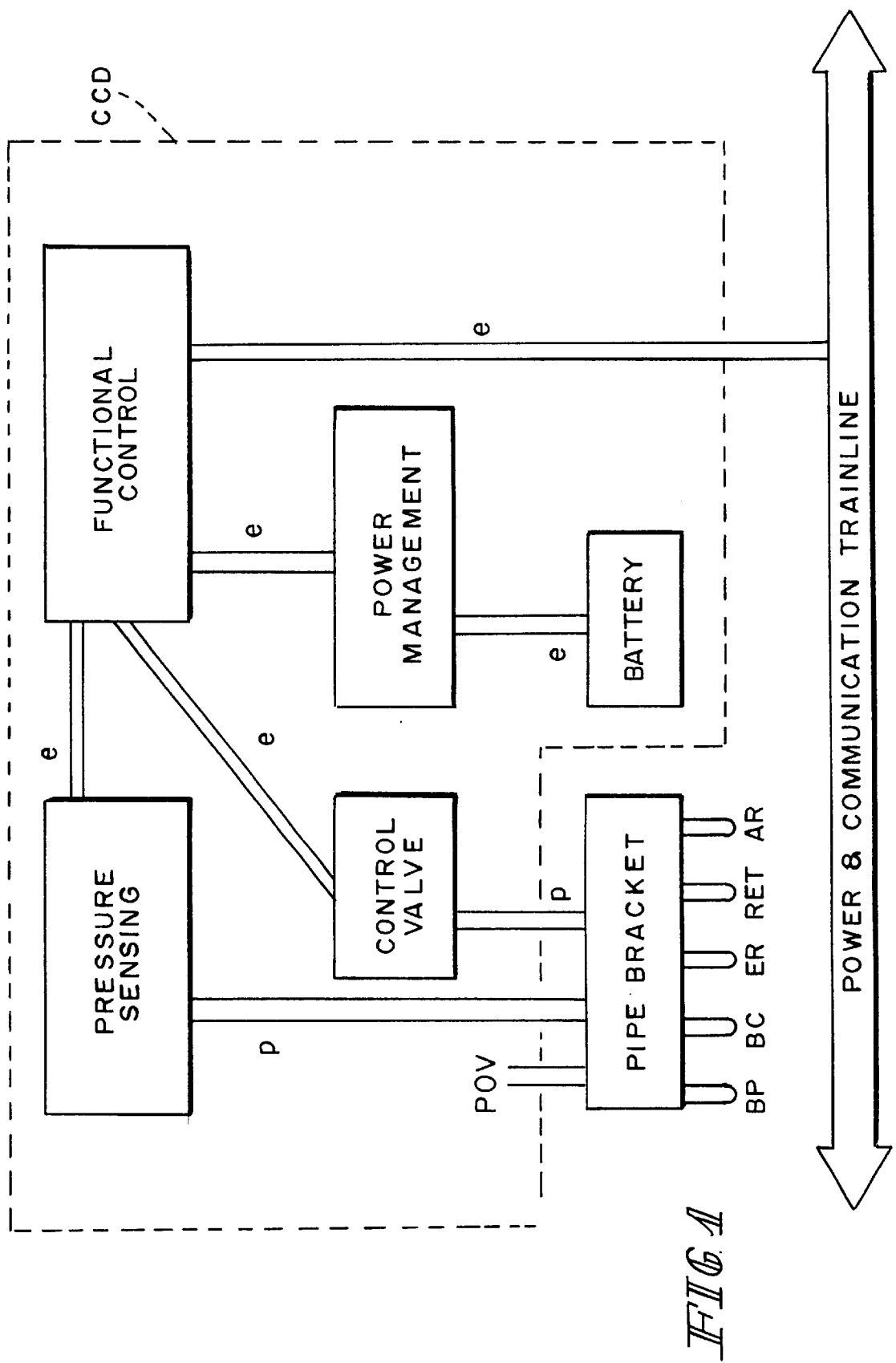
FIG. 1 is a general schematic flow diagram of a car control device.

FIG. 1 shows the general schematic makeup for the various systems involved in the construction of a car control device. A power and communication trainline connects each car of a train. On each car is a car control device comprising various cooperating systems. A pipe bracket connects the car control device CCD to the pneumatic brake system. The pneumatic inputs are brake pipe BP, brake cylinder BC, emergency reservoir ER, retaining valve RET and auxiliary reservoir AR. A control valve system as well as a pressure sensor system is configured to mate with various and pneumatic ports to supply pneumatic signals to a control valve system as well as a pressure sensor system by a manifold.

The control valve system comprises a network of pneumatic and electropneumatic valves in communication with the pneumatic manifold to provide braking signals to a brake cylinder. A pressure sensor system is in pneumatic communication with both the control valve system and the pipe bracket, and consequently numerous ports on pneumatic manifold, to determine pressure in at least four points in the pneumatic manifold. Preferably, these pressure sensors detect and determine pressures at the control valve port, the emergency reservoir port, the brake pipe port, and the brake cylinder port. The pressure sensor system is equipped with transducers which convert the pneumatic signals to electrical signals. These electrical signals, in turn, are communicated to a functional control system.

The functional control system provides electric control signals to each electropneumatic valve of the valve control system. These signals are capable of selectively opening and closing the respective valves, namely the supply valve, exhaust valve, or electropneumatic isolator valve, etc. in order to pneumatically control the brake cylinder.

Additionally, the functional control system is in electrical communication with the power management system. The power management system is primarily responsible for providing electrical power to each of the electric components of the car control device, as well as charging a battery. The functional control system is also capable of determining whether a battery is in need of charging; if indeed this is the case, the functional control system may tap into the power and communication trainline for additional electrical power to assist in the charging of the battery.

Figure 2:
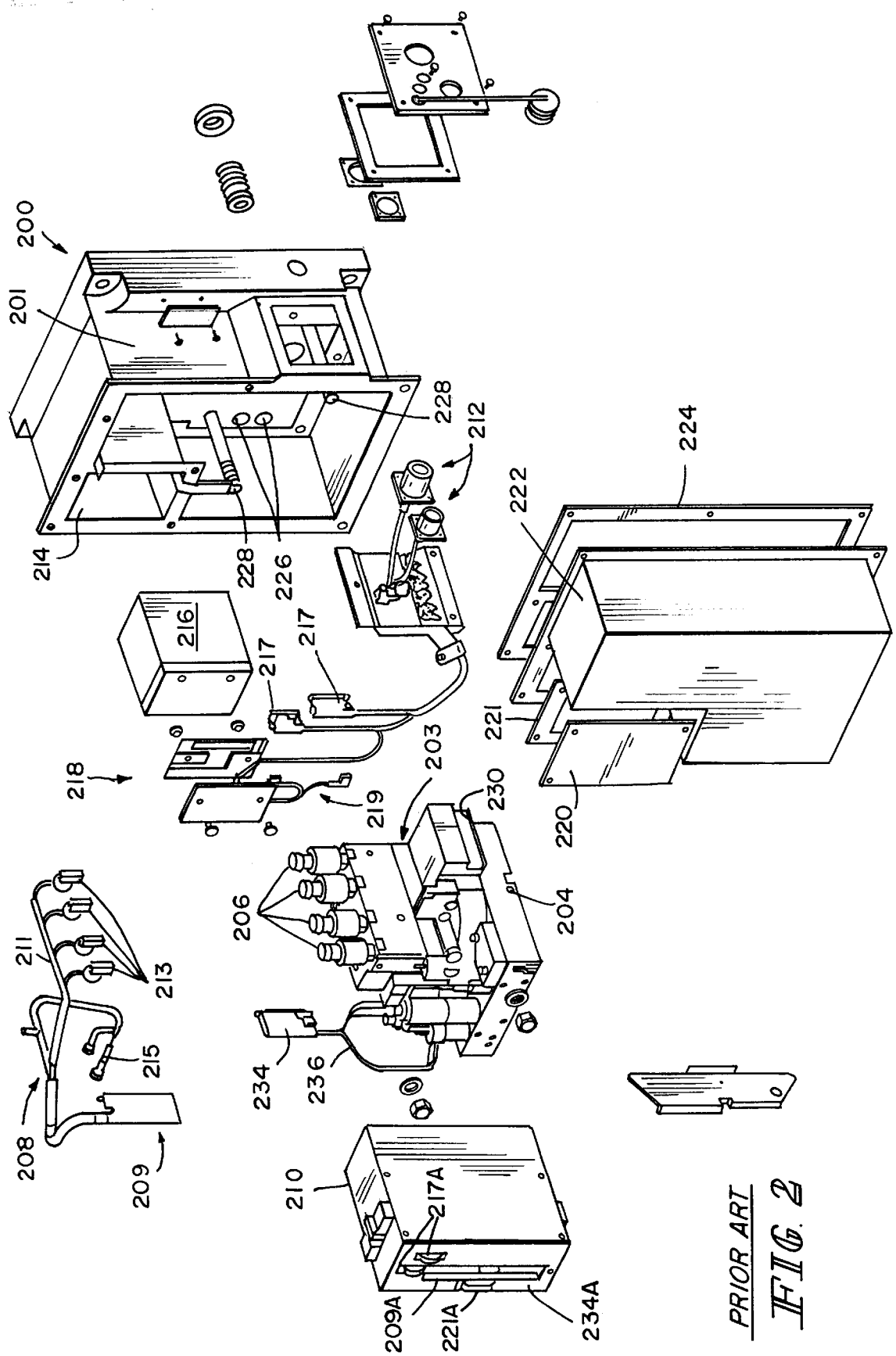
FIG. 2 is an exploded view of the various systems of a car control device of the prior art.

FIG. 2 shows an exploded view of a car control device system of the prior art. The car control device 200 includes a housing 201 with an interface 202 configured with numerous and various input ports 226 on its back wall to receive fluid communication from a pipe bracket (not shown). A control valve system 204 includes a pneumatic manifold 203 in fluid communication with each of the ports 226. The control valve system 204 further includes pressure transducers 206 individually mounted on a face of the manifold 203. Each of the transducers 206 transmits the respective electrical signals from individual connectors 213 via leads 211 of a wiring harness 208 to a common connector 209. The wiring harness 208 also includes leads 215 connected to light emitted diodes 213. The connector 209 is configured to mate with a terminal 209A of functional control and power management system 210. The functional control and power management system 210 is also in electric communication with each of the supply valve 205, the exhaust valve 207 and the electro pneumatic isolator valve (EPI) 302 via leads 235 and connector 234 to selectively activate or deactivate their respective valves. The functional control and power management system is also in electric communication to charge the battery 216 if needed via leads 219 and connector 217.

The car control device housing 201 further includes a compartment 214 for receipt of the battery 216. The terminals of the battery 216 are electrically connected by means of a battery connector system 200 connected to battery leads 219. The battery leads 219 extend to connector 217 which mates with port 217A on the functional control and power management system 210. The battery leads 219 are also in electric communication with external plugs 212 which connect the car control device to the trainline and also connect to external plugs 212.

The car control device system 200 further includes a cover 222 configured to enclose each of these components. Additionally, the prior art teaches a separate removable cover 220 is provided for the battery compartment 214, thereby allowing access to the battery chamber 214 without disturbing the remaining content of the CCD. In order to insure a tight fit as well as to absorb vibration, a gasket 224 may be included for cover 222. For the same reasons a gasket 221 maybe secured beneath the battery compartment cover 220.

The car control device 200 further includes bolts 228 extending from a rear face into the interior of the compartment 229 of the housing 201 in order to fasten the manifold 203 and all the systems mounted thereon to the housing 201. Note that the manifold 203 includes a ridge 230 configured to receive the bolt 228.

Figure 3:
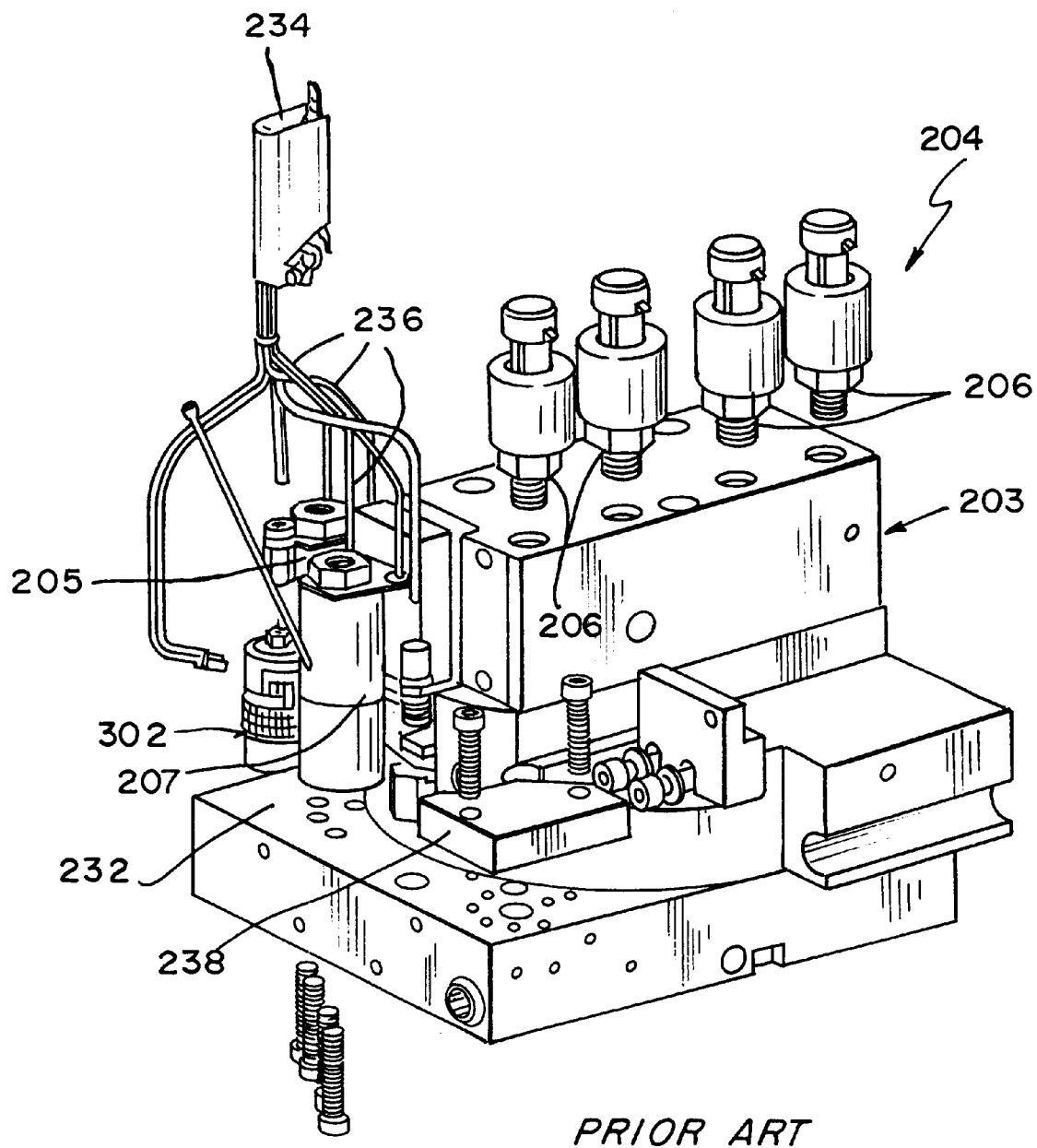
FIG. 3 is an exploded view of a control valve and pressure sensor system of the prior art.

FIG. 3 represents a closeup view of the pressure sensor and control valve system 204. The prior art device included an integrally configured manifold 203 in fluid communication with the pressure transducers 206 detecting the pressure at various locations. The pressure transducers 206, comprise a control valve transducer CVT, an emergency reservoir transducer ERT, a brake pipe transducer BPT, and brake cylinder transducer BCT. The manifold 203 is also in fluid communication with ports connected to a supply valve system 205 and an exhaust valve system 207. Each of the valves is mounted and affixed to a surface 232 of the manifold and adjacent to an electropneumatic isolator valve (EPI) 302. Note that each of the valves, 205, 207, 302 are in fluid communication with the manifold 203 to selectively direct airflow through various passages of the manifold in response to electrical signals received from the functional control system. FIG. 2 depicts the wiring harness system 208 comprising electrical caps 213 to a connector 209. The connector 209 mates with the functional control and power management system 210 at 209A. Leads 236 extend from the connector 234 to establish respective electric communication between valves 205, 207, 302 and the functional control and power management system 210 in order to selectively operate the valves.

A blanking plate 238 is firmly placed over apertures in communication with the manifold 203. As shown, with the blanking plate 238 in place on the surface 232, the control valve system is configured to the overlay mode. The blanking plate 238 may be removed and replaced with a POV valve and a charging check valve and choke in order to allow the pressure sensor and control valve system to operate in the stand-alone configuration. Additionally, in order to operate the pressure sensor and control valve system in the stand-alone configuration, the EPI 302 must also be removed form the surface 232 and replaced with a plug (not shown).

Comparing FIGS. 2 and 3, it is clear that each of the systems of the prior art are tightly arranged, making maintenance and conversion of the system a very difficult and arduous task. The prior configuration allows one to remove, change, or disconnect a battery 216 from the system, but the remaining components were often crowded and difficult to reach without disturbing any of the connections or removing the manifold 203.

A primary purpose of the present invention is to provide a configuration wherein the housing has an integrally configured manifold in fluid communication with the proper pneumatic control devices, and each of the pneumatic and electric components are accessible such that one may access a selected component without disturbing the configuration of the remaining components. The configuration therefore involves the physical makeup of the various components or modules as well as the integrally configured manifold inside the device. A configuration for the pneumatic manifold is set forth in FIGS. 2A through 2D of U.S. Pat. No. 5,967,620 to Truglio et al. Truglio et al. discloses a schematic network for a pneumatic manifold in communication with a series of valves and pressure transducers.

As mentioned before, the configurations of the manifold 203 as set forth by Truglio in 2A through 2D were effective, but often are configured in a crowded physical structure wherein the components were difficult to reach and consequently difficult to access. The difficulty in accessing the various ports to replace valves or transducers is often a time consuming and laborious process. As such, improvement of the physical structure as well as the pneumatic makeup of the car control device was needed to reduce labor costs and ease the burden of addressing problems in remote areas of the device.

Figure 4:
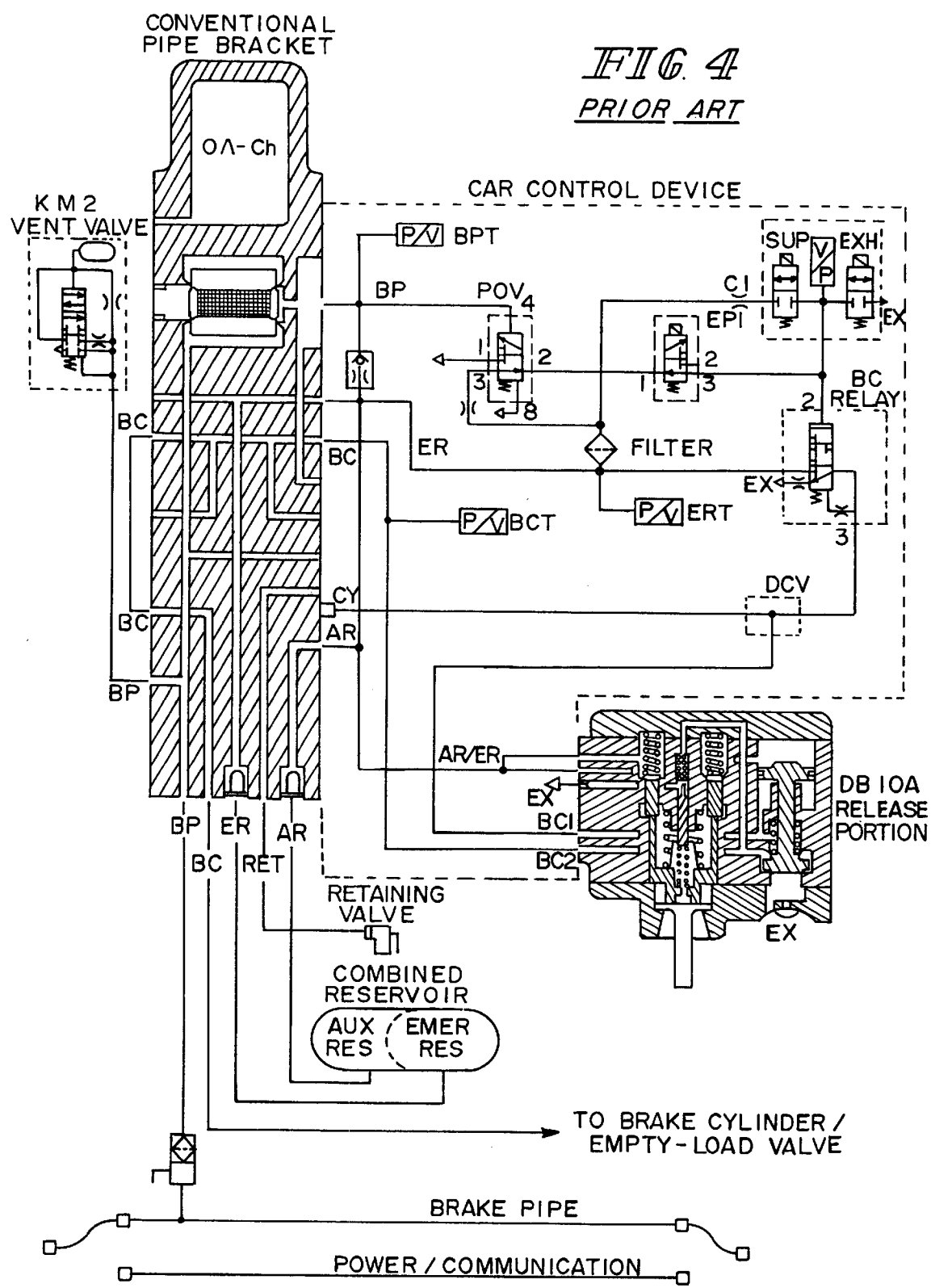
FIG. 4 is a pneumatic diagram of the car control device of the prior art in a stand-alone configuration.

FIG. 4, which corresponds to FIG. 2D of Truglio, provides another schematic diagram and details the positioning of the various valves and conduits within the manifold. Note that each of the ports corresponding to a brake pipe BP, emergency reservoir ER, brake cylinder BC, and auxiliary reservoir AR are in direct fluid communication with a respective pressure transducer. Specifically, the brake pipe as shown in FIG. 4 is in direct fluid communication with a brake pipe transducer BPT; the emergency reservoir is in direct fluid communication with an emergency reservoir transducer ERT; the brake cylinder is in direct fluid communication with a brake cylinder transducer BCT and the brake control valve transducer is in direct fluid communication with the brake cylinder relay and the supply SUP and exhaust EXH valves.

In the stand-alone configuration depicted in FIG. 4, a charging check CC is positioned between the brake pipe BP and emergency reservoir ER. As such, when brake pipe pressure reaches a predetermined level, charging check CC will open, creating fluid communication between the brake pipe BP, emergency reservoir ER and auxiliary reservoir AR to charge the two reservoirs. Also, in the stand-alone configuration depicted in FIG. 4, a pilot operated valve POV responsive to brake pipe pressure provides a control pressure to the brake cylinder relay valve via an electropneumatic isolator EPI valve. The double check valve DCV is removed. The release portion is mounted to the car control device 200

Figure 5:
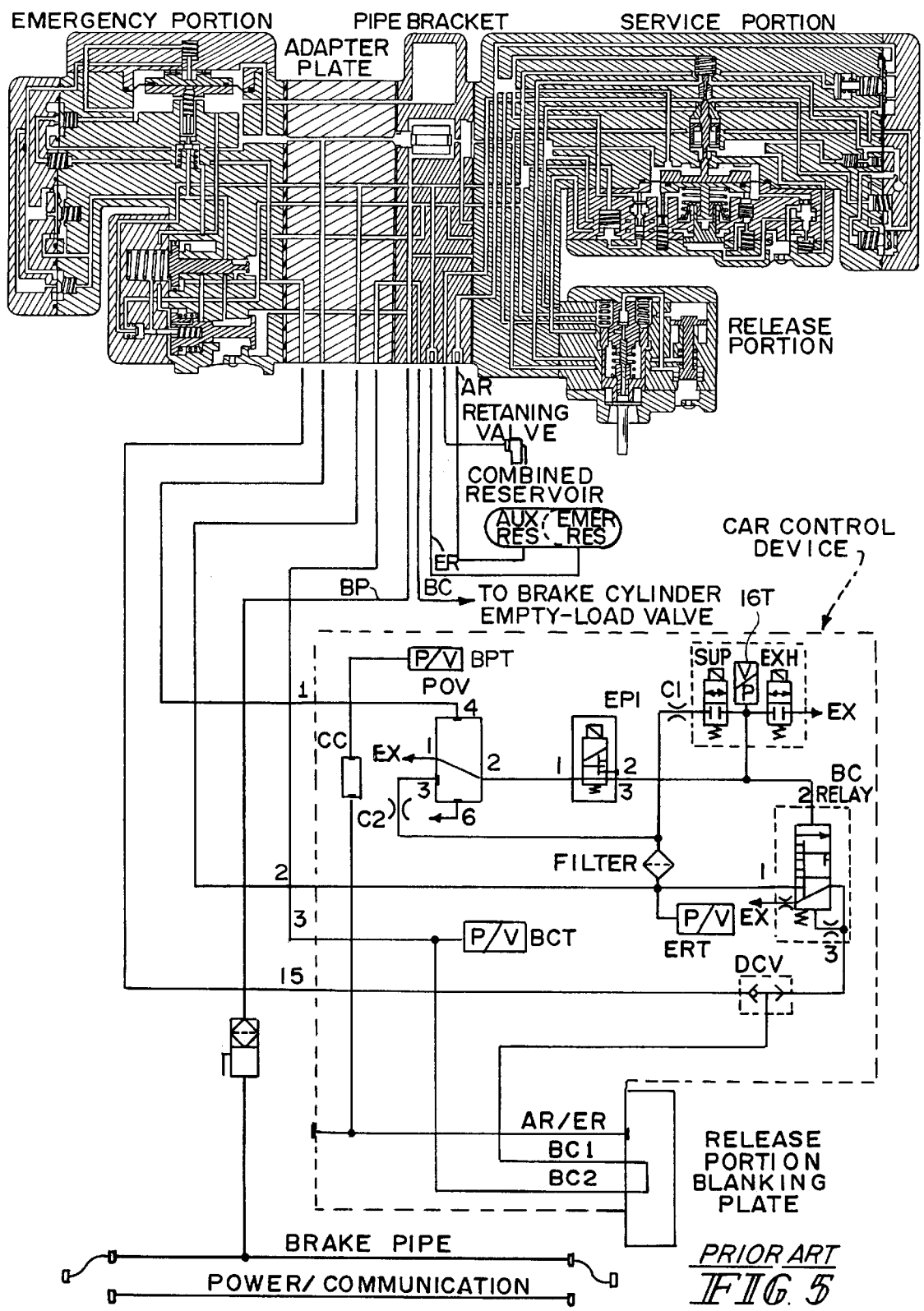
FIG. 5 is a pneumatic diagram of the car control device of the prior art configured in the overlay mode.

FIG. 5 depicts the prior art brake control system in its overlay configuration. Note that a charging check CC which connects the brake pipe with the emergency reservoir when in the stand-alone configuration, is removed in the overlay configuration. The reservoirs ER and AR are charged through the service portion of the brake valve. Furthermore, the pilot operated valve POV is removed in this configuration, since the emergency portion of the brake valve provides pneumatic braking signals. The double check valve DCV provides either the brake signal from the brake valve or the brake cylinder relay to the brake cylinder. Since the release portion is on the brake valve, it is removed from the car control device. The prior art device, therefore, was capable of two distinct configurations. The conversion process was time-consuming and difficult due to the crowded interior of the device.

For ease of installation, on both new and existing cars, the housing has been designed to fit within the installation envelope of the DB-10/ABDX Service portion. In the Stand-Alone configuration, the housing mounts directly to the AB-Pipe Bracket, a standard pipe bracket in the industry, uses existing studs and gaskets, and requires no hoses or adapters. In addition, it mounts equally well on either a traditional AB Pipe Bracket or a modern Single Sided Pipe Bracket. The combination of the lightweight aluminum housing and the Single Sided Pipe Bracket make for a very ergonomically friendly installation.

The housing is preferably an aluminum casting, which interfaces to the AB pipe bracket, houses the electronic and pneumatic elements. In addition, it provides environmental and EMC protection, high structural integrity, high natural frequency, low resonance response and lightweight in a DB-10/ABDX Service portion envelope. Therefore, this new device may be integrated into existing standard systems.

In keeping with the "Mechantronics" design philosophy, total part count has been reduced by 60% from the first generation design, and the number of discrete electrical connectors in the assembly has been reduced by 64%. All this achieved while increasing functionality. These metrics are not only important indicators of the degree of design optimization achieved, but are also directly correlated to reliability robustness.

The car control device electronics have been reduced to electronic two modules: The Functional Control Module (FCM), and the Power Management Module (PMM). The FCM integrates the Brake Control, and Sensor Interface, and supervisory Power Management functions into a single circuit board assembly. The FCM is mounted into the cast aluminum cover that makes up the side of the Car Control Device. The integrated design of the cover and the FCM PCB provide an efficient, robust packaging arrangement for a high-vibration environment. The power management module controls battery charging and capacity monitoring.

The current invention is configured to be identical to and positioned in the same area as existing equipment, such as the DB60 manufactured by New York Air Brake Corporation. An example of a release valve from the prior art is disclosed in U.S. Pat. No. 5,988,706 to McCurdy, Jr. (see, e.g., FIG. 1, reference number 18). As such, no change of connections is required, and no additional expense will be incurred by converting to the use of the car control device.

Figure 6:
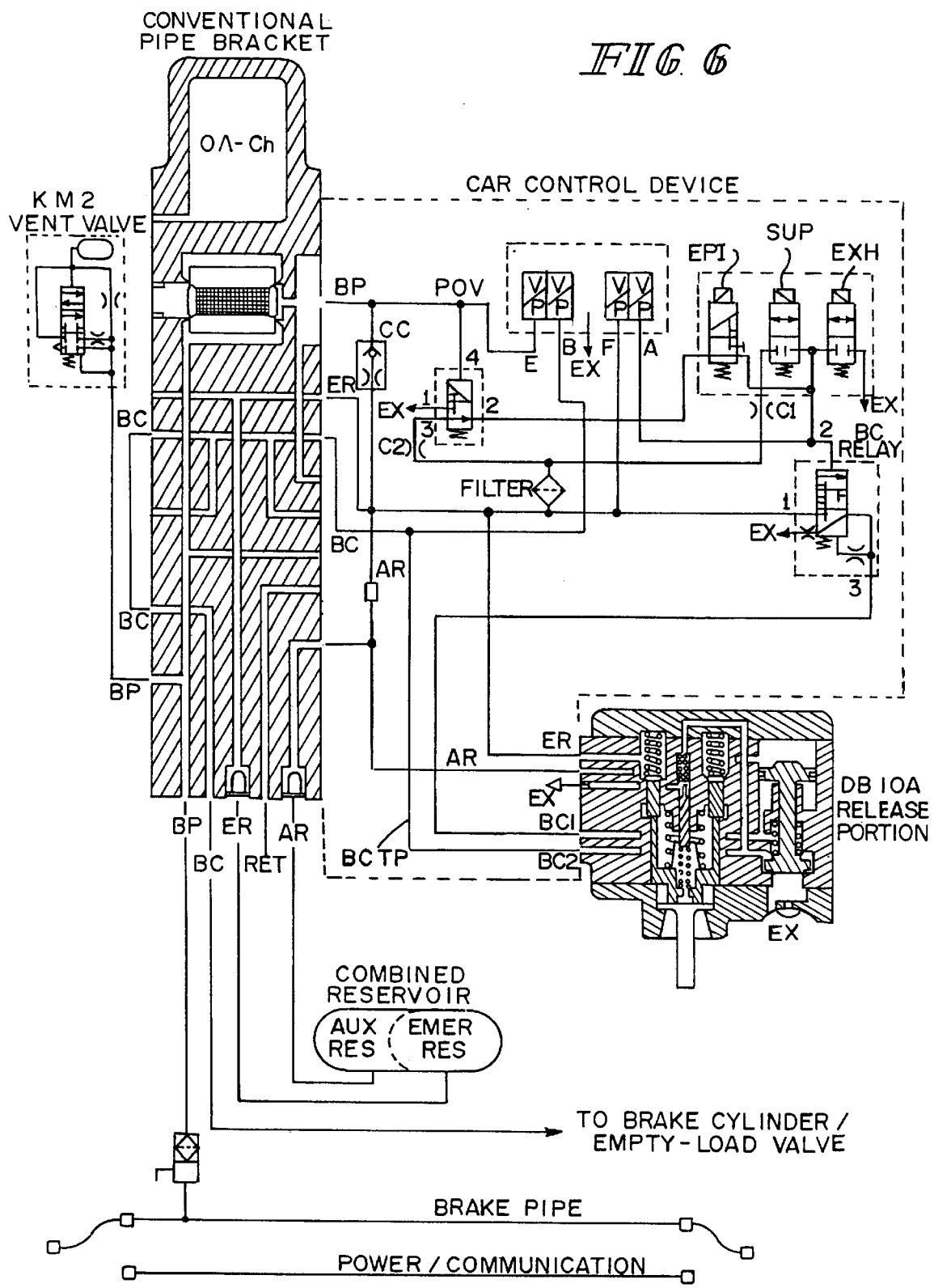
FIG. 6 is a pneumatic diagram of the invention in the stand-alone configuration.

The present invention improves upon the configuration of the prior art manifold by arranging pneumatic ports and collecting elements in modules on various faces of a unitary housing and manifold structure. FIG. 6 depicts a schematic of the inventive car control device in its stand-alone configuration. In the present invention, each of the transducers, namely the brake pipe transducer BPT, brake cylinder transducer BCT, emergency reservoir transducer ERT, and control valve module transducer CVT remain in fluid communication with their respective ports. However, all of the pressure transducers BPT, BCT, ERT and CVT are in a single, sealed pressure sensor module PSM, and mounted as a unit to the housing 401 and the manifold 203. A brake cylinder test port BCTP is provided on the housing 401. This will be discussed in greater detail with respect to FIGS. 29–31.

In like manner, the overlay configuration of the invention, as depicted in FIG. 7, further includes an electropneumatic isolation valve EPI in direct fluid communication with each of the supply SUP and exhaust EXH valves. However, the manifold 203 is configured such that each of these ports EPI, SUP, EXH are all in close proximity to one another and therefore form a control valve module CVM on a separate submanifold, as shown in FIGS. 24–27, that is mounted on the manifold 203 and is in direct fluid communication with the brake cylinder relay valve BC. In the stand-alone configuration depicted in FIG. 6 includes the charging check CC is positioned between the brake pipe BP and the emergency reservoir. Additionally, the stand-alone configuration of the present invention further includes a pilot operated valve POV responsive to the brake pipe BP pressure. The release portion is mounted at a release interface to the manifold 203. A brake cylinder test port BCTP is also shown on FIG. 6.

Comparing the stand-alone configuration as depicted in FIG. 6 to the overlay configuration as depicted in FIG. 7 of the present invention, several very readily apparent differences exist. The choking check CC is replaced with a plug. Therefore, fluid communication between the brake pipe and the emergency reservoir is prevented in the overlay configuration. The plug is configured to also disconnect the passages in the manifold that connect the emergency and auxiliary reservoir ports. Additionally, the pilot operated valve POV is removed from the manifold and the electropneumatic isolator valve EPI is removed from the control valve module. Additionally, the overlay configuration as depicted in FIG. 7 has an overlay assembly in fluid communication with the emergency reservoir ER, auxiliary reservoir AR, and the brake cylinder BC1, BC2 at the release portion interface. The overlay assembly comprises an overlay magnet valve OMV and a pilot operated valve POV. Note that the porting configuration for the invention with respect to the DB 10A release portion, which is present on the car control device in the stand-alone configuration of the invention only, is identical to the porting required for the overlay assembly of the invention in the overlay configuration. The overlay magnet valve OMV and pilot operated valve POV operate to select the brake signal for the brake cylinder port BC. In the deactivated position shown for the overlay magnet valve OMV, the pilot operated valve POV/OL connects the auxiliary reservoir port, which receives a braking signal from the pneumatic control valve to the brake cylinder port BC2. When the overlay magnet valve OMV is electrically activated, it provides a pilot signal to the pilot operated valve POV/OL, moving it to its second position. In this position, the pilot operated valve POV/OL connects the output of the brake cylinder relay at BC1 to the brake cylinder ports BC, BC2. Thus, the brake signal for the brake cylinder is determined by the control valve module CMV control of the brake cylinder relay BC.

The Housing

FIG. 8 shows the physical construction of the body or housing 401 of the car control device 400, shown without components. The car control device 400 includes an integrally formed pneumatic manifold 486, and has numerous faces for mounting of the various modules or components of a car control device 400. The configuration allows for one to access selected systems of the car control device without disturbing nonselected systems. The car control device is made of a lightweight metal, preferably aluminum.

On a first face 412 of the housing 401 is a battery compartment 402. Sides of the compartment are configured with a profiling 404. As depicted, the profiling 404 will extend along an outer surface of the upper and lower portions of the compartment. The profiling 404 towards the upper side of the compartment 402 is a different size than the profiling 404 toward the lower end of the compartment. As shown in detail in FIGS. 31, 32 and 34, the profiling 404 prevents the battery 100 via its battery carriage 500 from being inserted into the battery compartment 402 with an improper orientation.

Figure 15:
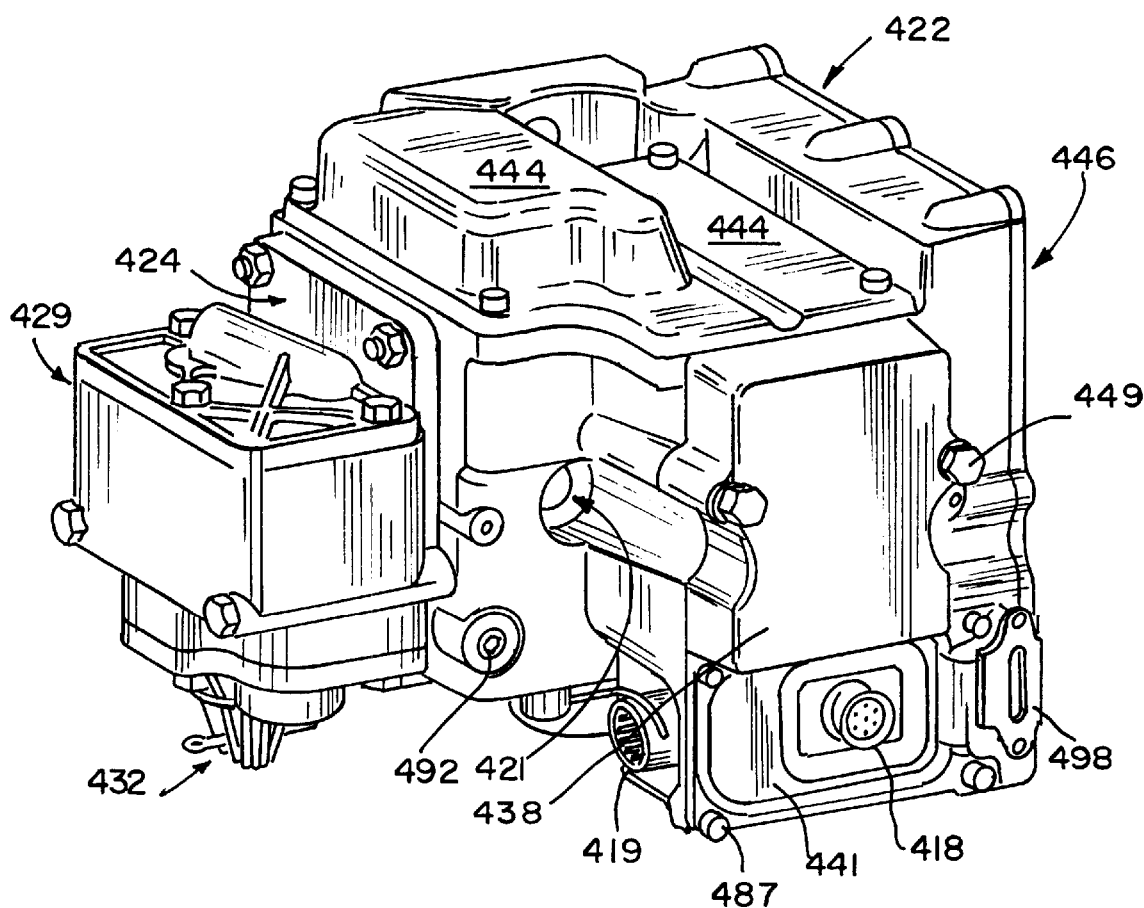
FIG. 15 is a perspective view of the multi-compartment car control device, depicting the various compartments and covers therefor.

Also on the face 412 of the housing 401 for compartment 408 for receipt of electrical plug 418, as shown in FIG. 15. A second opening 492 for a second plug 419 is located on a side face 427 for protection, as shown in FIG. 13. The plugs 418, 419 provide the input to the car control device CCD, preferably from an identification module and communication with the power communication trainline. The first face 412 also includes two apertures 421 for receipt of a standard mounting bolt (not shown) from a pipe bracket (not shown). An opening 473 is provided on face 412 of the housing to allow visual access to the light emitting diodes 472 on the functional control module FCM.

A gasket 417 is placed around each compartment 402, 408 in order to insure an airtight seal between the compartment and its cover. Optionally, these gaskets may be positioned in recesses in the perimeter of the respective compartments 402,408.

On another face 422 is a power management module compartment 420, a control valve module compartment 410, and pressure sensor module compartment 431. Each of these compartments 410, 420, 431 are configured to receive the power management module PMM and the control valve module CVM and pressure sensor module PSM, respectively. The power management module PMM forms the top wall of the battery compartment 402, as will be discussed in detail later.

A functional control module compartment 426 is configured on another face 425 of the housing 401. Inside the functional control module compartment 426 is a pilot operated valve port 428 as well as a filter port 430. A charge chock and check valve port 443 is located on a bottom 434 of the housing 401, as shown in FIG. 14. A pilot operated valve and chock and check valve are removably insertable into these ports in order to convert the car control device from an overlay to a stand-alone configuration.

FIG. 9 depicts the back face 500, which includes a generally circular interface 503 having a plurality of ports and apertures therein for mating with a standard service portion interface on a standard pipe bracket. Apertures 421 and 506 extend all the way through the housing for receiving bolt or studs in order to more securely fasten the housing 401 to a pipe bracket. Apertures 504 are configured to allow fluid communication with the manifold 486 from various fluid ports of a pipe bracket. Specifically, the apertures 504 are 504BP in fluid communication with the brake pipe, 504ER in fluid communication with the emergency reservoir, 504BC in fluid communication with the brake cylinder, and 504AR in fluid communication with the auxiliary reservoir. A special conversion port 504SP is also included on the interface 503. The pneumatic connection of these respective ports can be viewed by comparing FIGS. 7 and 8.

Figure 36:
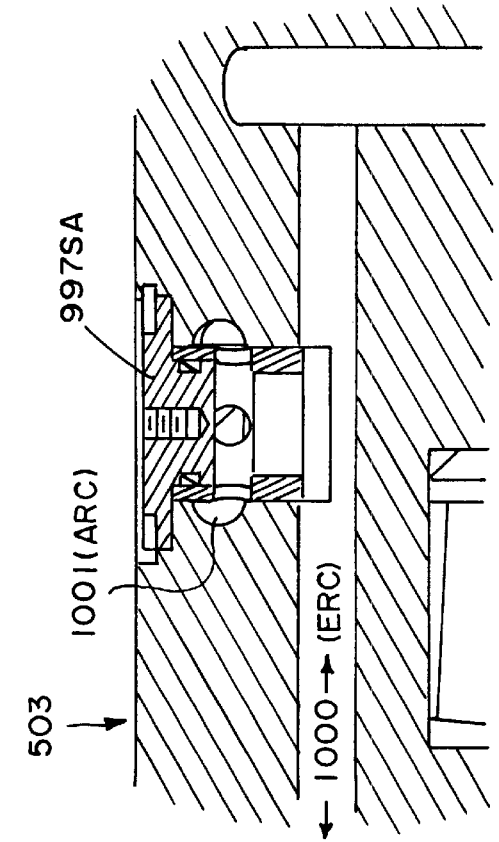
FIG. 36 is a cross-sectional view of a special stand-alone plug for the auxiliary reservoir port on the overlay assembly.
Figure 35:
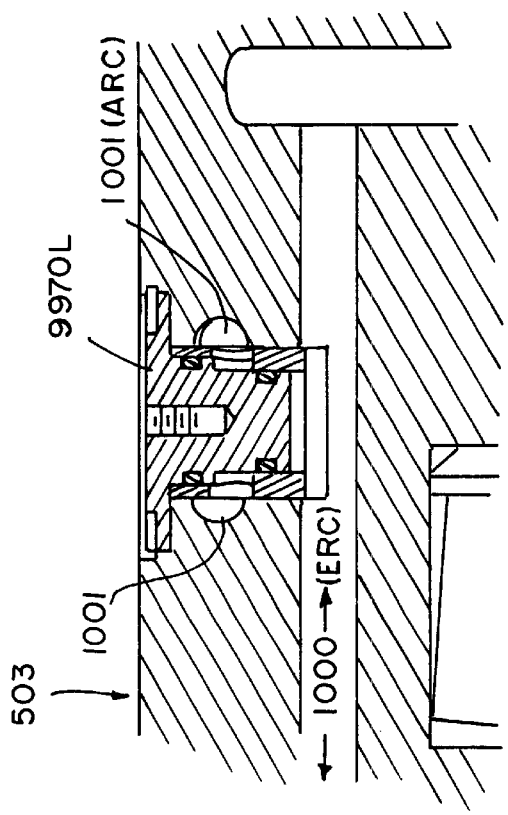
FIG. 35 is a cross-sectional view of a special overlay plug for the auxiliary reservoir port on overlay assembly.

Comparing FIGS. 9, 35 and 36, special plugs 997 are required to execute the conversion as well. Each special plug 997 is configured to fit within aperture 504 SP. FIG. 35 is a cross-sectional view of a special overlay plug 997OL for the auxiliary reservoir port on overlay assembly. In contrast, FIG. 36 is a cross-sectional view of a special stand-alone plug 997SA for the auxiliary reservoir port 504AR on the overlay assembly. Therefore, complete conversion of the car control device requires that the proper special plug 997 OL or 997SA be inserted into the special conversion port 504SP.

As seen in FIGS. 35 and 36, the manifold is formed so that the conduit 1000 leading to the emergency reservoir ER is connectable with the conduit 1001 leading to the auxiliary reservoir AR. In the overlay configuration depicted in FIG. 35, the special plug 997 OL prevents fluid communication between conduit 1000 and 1001. As shown in FIG. 36, however, the special plug 997SA is configured to allow fluid communication between conduits 1000 and 1001.

FIG. 9 depicts the special conversion port 504 SP to be on the pipe bracket interface 503; however, the special conversion port may be configured elsewhere on the manifold 486, but it is found that the sealable pipe bracket interface 503 provides a sturdy, airtight, and accessible location.

FIG. 10 provides a frontal view of the first face 412. A brake cylinder test port 423 on face 424 preferably requires no special adaptor, and requires no special pipe bracket.

FIG. 11 depicts a top view of the upper face 422, depicting the relation of the power management module compartment 420 and the control valve module compartment 410. FIG. 12 depicts a cross section, as viewed from plane AA on FIG. 11. FIG. 12 shows a relay valve port 432 in the bottom 434 of the housing 401. FIG. 12 further depicts the control valve module compartment 410 connected to the functional control module compartment 426. Bore mounting holes 421 pass through the entire length of the housing 401 and receive standard mounting bolts (not shown) or other connectors (not shown) which fasten the car control device to a pipe bracket.

The bore holes 421 are configured to be in an analogous location as the standard existing system, as shown, for example in U.S. Pat. No. 5,988,766 to McCurdy. The bore holes 421 of the instant invention are configured to match the configuration of bolts 12 of the McCurdy '766. Unlike the McCurdy '766 patent, however, which required an adaptor 50, the car control device of the instant invention does not require a special adaptor. Thus, this invention can be instantly integrated into existing systems without requiring additional expense.

FIG. 13 depicts the side view showing the overlay interface 425 having a plurality of ports 436 opening onto the manifold 486. Specifically, the ports 436 comprise the following:

$436_{BC1}$, in communication with the Brake Cylinder;

$436_{BC2}$, in communication with the Brake Cylinder;

$436_{AR}$, in communication with the Auxiliary Reserve;

$436_{ER}$, in communication with the Emergency Reserve;

$436_{ATM}$, in communication with the atmosphere; and, $436_{EXH}$, an exhaust port.

This is the standard interface for a standard release portion. Also, its location is substantially the same with respect to the pipe bracket interface. Thus, the standard levers to operate the release portion do not have to be adjusted or altered.

The manifold 486 further includes port $436_{WIRE}$ which is not a fluid port, but instead is used for a wire passage when the car control device is configured in the overlay mode. When in the overlay mode, $436_{WIRE}$ is plugged.

Also shown in FIG. 13 is an opening 492 for the electrical connector to the car ID module, sensor module and trainline.

The overlay module 429 is positioned and configured in order to allow easy conversion of the car control device to operate in the stand-alone or overlay configuration affecting the mounting or envelope size. As discussed with respect to FIGS. 6 and 7, a release portion is connected to the overlay interface 425 in the stand along configuration and the overlay module 429 is connected at the interface 425 in the overlay configuration. The pneumatic schematic for the stand-alone and overlay configurations are shown in FIGS.

6 and 7, respectively. In order to accomplish the stand-alone configuration as shown in FIG. 6, a POV valve and charging check and choke are installed onto ports on the main manifold 486 (as shown in FIG. 13). The POV valve is installed into POV port 428 in the FCM compartment 426 (FIG. 8). The charging check is installed into the charging check port 443 in the bottom 424 (FIG. 14).

In order to convert the car control device to an overlay configuration as shown in FIG. 7, the POV valve, EPI valve, and charging check valve CC, are removed from ports 428 and 443 and replaced with ordinary plugs. The service portion of the pneumatic brake control valve includes a charging check and the overlay module 429 includes the POV.

Figure 16:
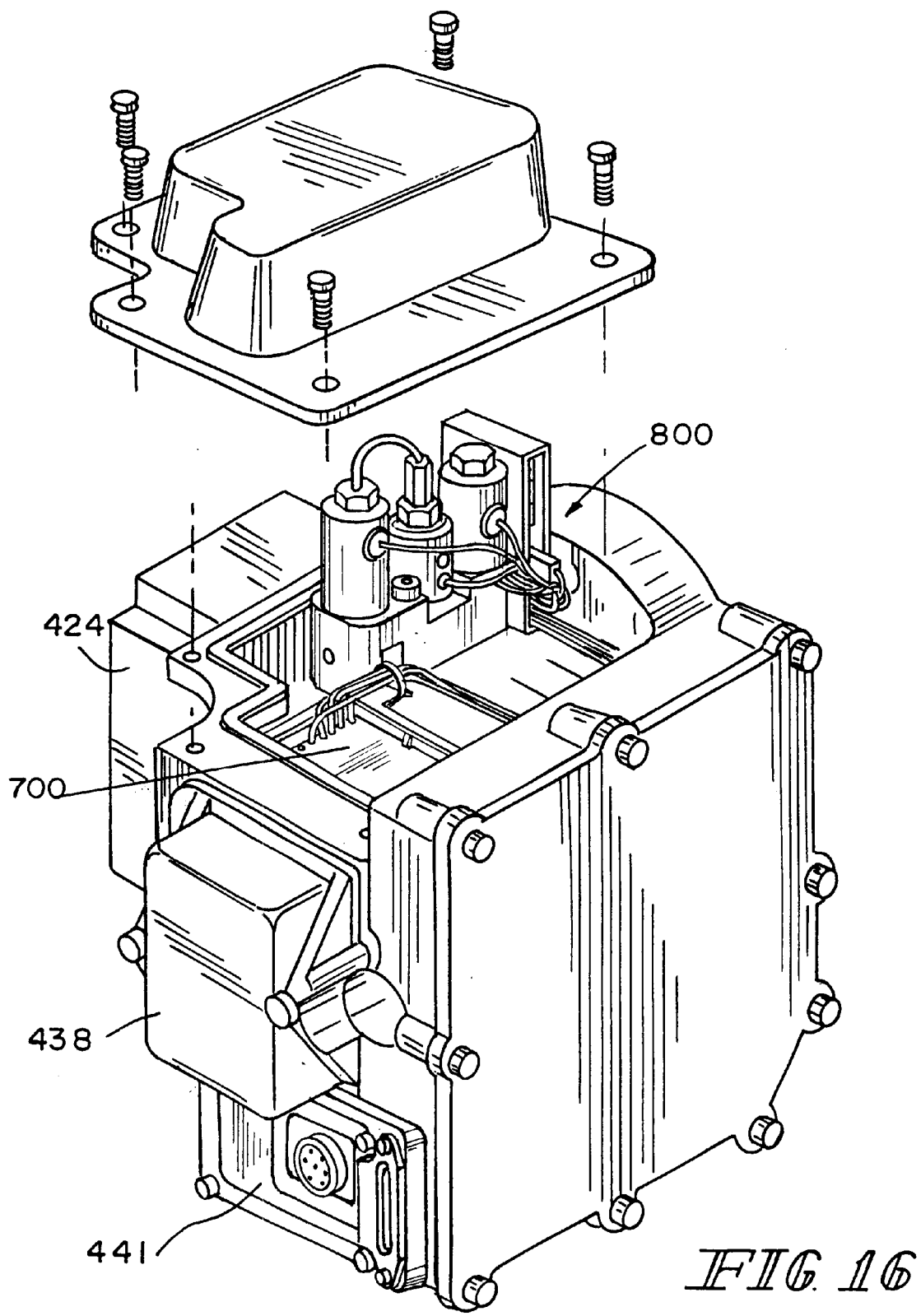
FIG. 16 depicts a perspective view of the car control device housing depicting the various covers for each of the compartments.

FIGS. 15 and 16 provide differing views of the housing 401 with the respective covers over the compartments. In the embodiment shown, each module is separately accessible with a separate cover. Gaskets 417, 471 are provided between the housing 401 and the covers to form an air tight enclosure with the housing 401. As shown in FIGS. 15 and 16, each of the faces of the housing is equipped with a cover. For example, the battery compartment 402 is covered by battery compartment cover 438, and held in place by connectors 449 As shown in FIG. 33, the battery cover 438 includes an aperture 437 with a check valve 439 in order to allow hydrogen gas to escape from the battery compartment 402. The connector compartment 408 is covered and protected by connector cover 441 and fastener 487 which includes connector 418. The opening 473 for the light emitting diodes 472 is covered by a transparent window 498, as shown in FIG. 15. The overlay module interface 425 is sealed and protected by release portion in the stand alone configuration 429, which is firmly bolted over the overlay module interface 425. In the overlay configuration, a the overlay assembly is provided at this interface 425.

The power management module 700 and pressure sensor module 852 are each accessible through cover 444, as shown in the removed position in both FIGS. 15 and 16. A gasket 471 is positioned around the perimeter of the top face 422 in order to provide a sealing closure when cover 444 is installed. The functional control module cover 446 allows access not only to the functional control module, but also for a pilot operated valve port 428 and a filter port 430.

The Functional Control Module

Figure 19:
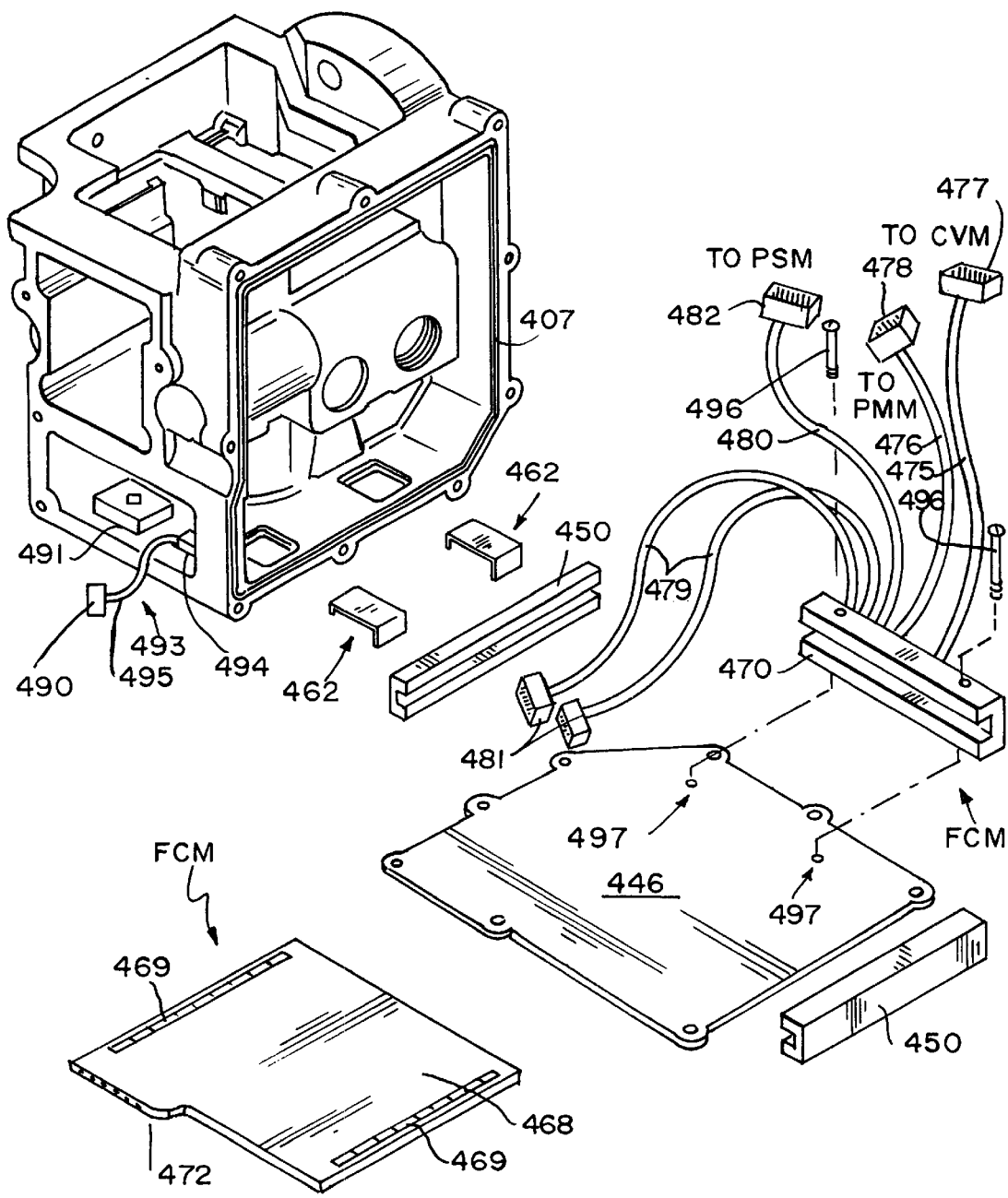
FIG. 19 is an exploded view of the functional control module of the present invention.

FIGS. 17–19 depict a perspective view of the housing 401 including a greater detail of the functional control module compartment 426 including the functional control module compartment cover 446.

The functional control module FCM interprets trainline communication signals and provides brake control signals to the control valve module, and reads feedback from the pressure sensor module. The functional control module also provides control signals to the power management module, which is responsible for charging the battery.

The functional control module compartment cover 446 is equipped with a pair of spaced apart groove members 450 on the interior of the cover 446. As shown in FIG. 19, the groove members 450 are separate parts that must be affixed to the cover 446. However, it has been found that groove members 450 may be integrally formed onto the cover 446, preferably by casting the groove members 450 and the cover 446 as a single, unitary part. The groove members 450 are positioned in order to form a channel 452 adjacent the interior of the cover 446. The cover 446 further comprises a plurality of apertures 454 preferably on or near a perimeter and the cover 446. The apertures 454 are cooperatively configured within the bores 458 along a perimeter 460 of the functional control module compartment 426 such that a fastener may be driven through the apertures 454 into the bore holes 458 in order to secure the cover 446 over the functional control module compartment 426. A gasket 407 is placed around the perimeter of the compartment 426 in order to create an airtight seal when cover 446 is installed.

The functional control module compartment 426 further comprises at least one retention hook or support member 462 mounted to the cover 446. In the shown embodiment, the retention hooks or supports 462 are mounted such that they are connected to both the groove member 450. The lower surface 466 of the functional control compartment 426 may have at least one recessed 464 configured in the surface 466. In a shown embodiment, the retaining hooks or supports 462 and the recesses 464 are cooperatively configured such that the retaining hook 462 engages the recess 464 when the cover 446 is moved to the open position as shown in FIG. 17. As depicted in FIG. 18, however, the hooks 462 may lie within the recess 464 when the cover 446 is moved to the closed position.

The hooks 462 act to support the weight of the functional control module cover 446 to prevent it from becoming disengaged from the housing 401. The circuit board 468 mounted to the cover 446 will have an edge connector with harnesses leading into other compartments of the car control device. The hooks 462 act to prevent the weight of the cover from pulling and harming the circuit board 468, its component electronics and the connecting wiring when accessing the functional control module compartment.

It should be noted that the hooks 462 are helpful, but not necessary. Thus, another preferred embodiment of the invention omits the hooks entirely.

Figure 34:
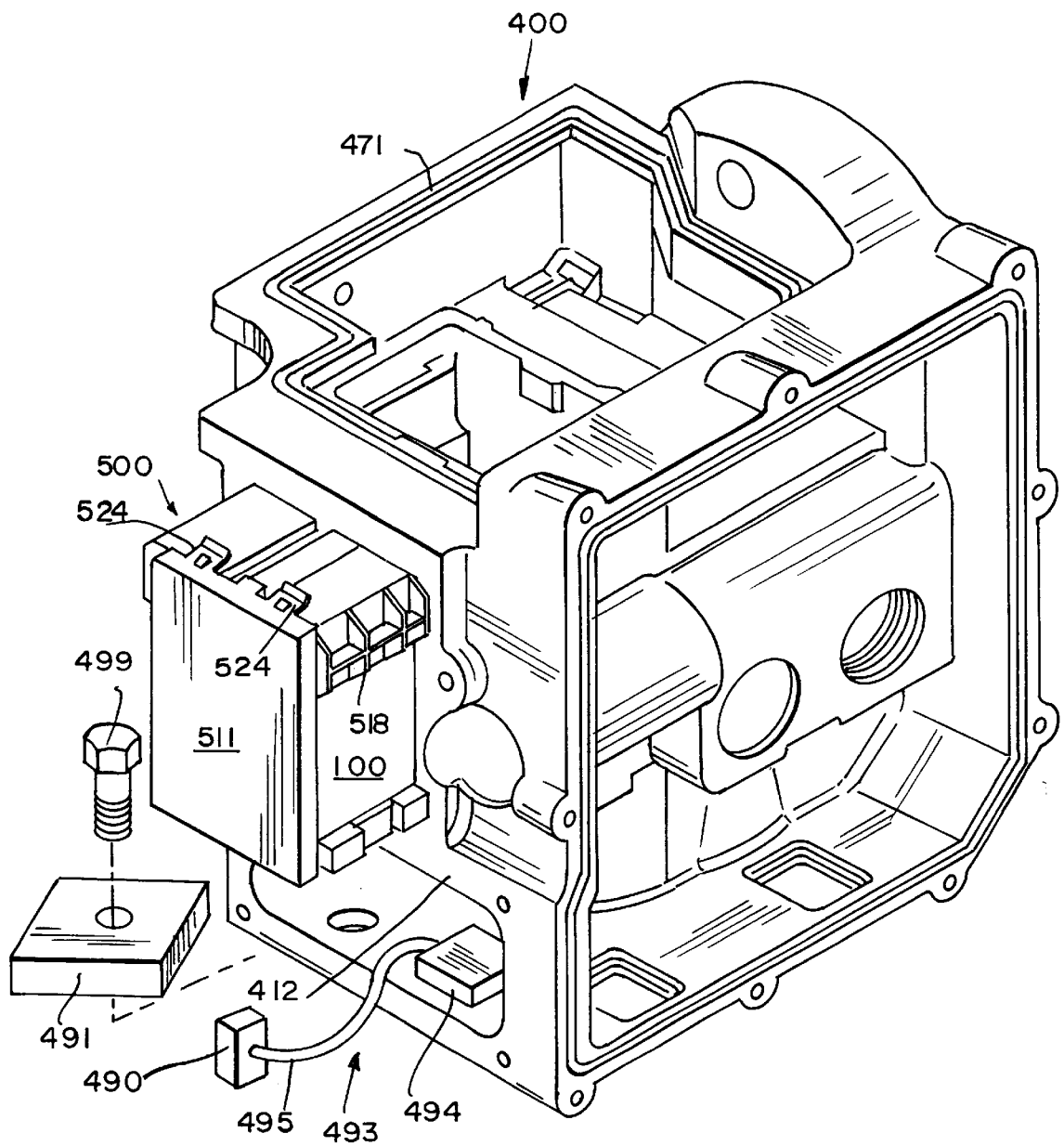
FIG. 34 is a perspective view illustrating the battery and battery carriage sliding into the battery compartment of the housing.

A desiccant 491 may be configured and placed inside the housing 401. As shown in FIGS. 19 and 34, the desiccant 491 is affixed via bolt 499 passing through the desiccant 491. The desiccant 491 may be configured elsewhere; however, it should be positioned so as to prevent the dangerous buildup of moisture and/or condensation near electrical parts.

Also shown in FIGS. 19 and 34, the car control device may also include a vibration sensing apparatus 493 comprising a vibration sensor 494 and an electrical lead 495 extending from the sensor to a connector 490. The vibration sensor is shown adjacent the desiccant 491; however, the vibration sensor apparatus 493 may be configured elsewhere. By placing the vibration sensor 494 and lead 495 in the housing 401, they are protected from the environment and the length of the lead 495 is minimized. Also, since the housing 401 is connected to the pipe bracket, the sensor 494 is mounted securely to the frame of a rail car.

The functional control module FCM comprises a circuit board 468 slidably inserted into the channel 452. A stop and edge connector 470 receives an edge of the circuit board 468 and mates with the circuit board 468 in such a way that insertion of the circuit board 468 into the channel automatically creates electrical connection between the circuit board 468 and edge connector 470. Card locks 469 are mounted on the circuit board 468 and lock the circuit board in the groove members 450.

The edge connector 470 may be attached to cover 446 by bolts 496 which pass through the connector 470 and into apertures 497 on the cover 446. Electrical lead 480 is in electrical communication with connector 470 and extends to a plug 482 configured to mate with the pressure sensor module PSM 852, as shown in FIG. 19. Edge connector 470 also is connected, by electrical lead 476 and plug 478, with the Power Management Module. Additionally, the edge connector 470 is connected, by electrical lead 475 and plug 477 to the Control Valve Module. Additionally, a set of two parallel leads 479 extend from edge connector 470 of the functional control module. These parallel leads 479 terminate in connectors 481. One of the connectors 481 is configured to mate with plugs 418, 419.

As shown in FIG. 19, one edge of circuit board 468 mates with connector 470. An opposite edge, however, will bear light emitting diodes 472 which will be viewable through an opening 473 when the car control device is closed. As shown in FIG. 15, a transparent window 498 will cover opening 473 in an airtight manner. These status LEDs 472 are visible from the front of the housing and CCD troubleshooting aids, such as trainline power status, communication status, Brake Apply or Release Status, and CCD Health. The LEDs 472 are identified on the face of the CCD.

The Power Management Module

Figure 20:
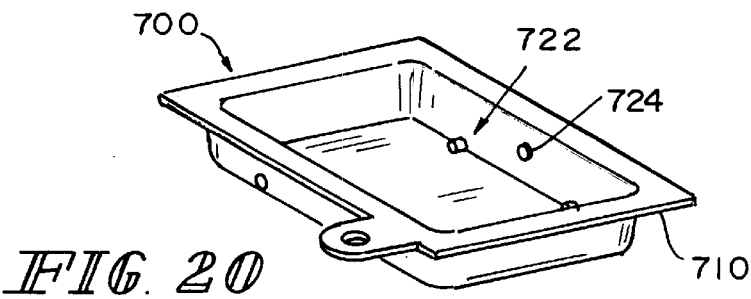
FIG. 20 is a perspective view of the frame of the power management module.
Figure 21:
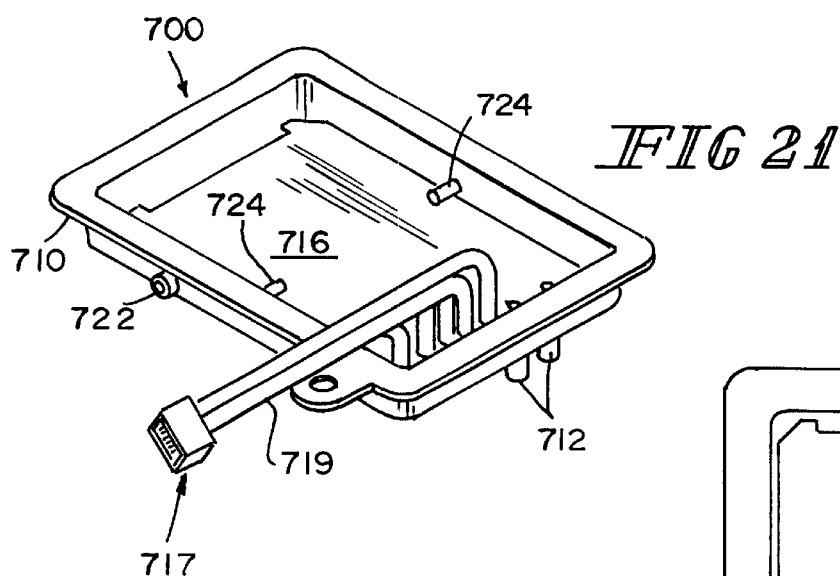
FIG. 21 is a perspective view of the power management module.
Figure 23:
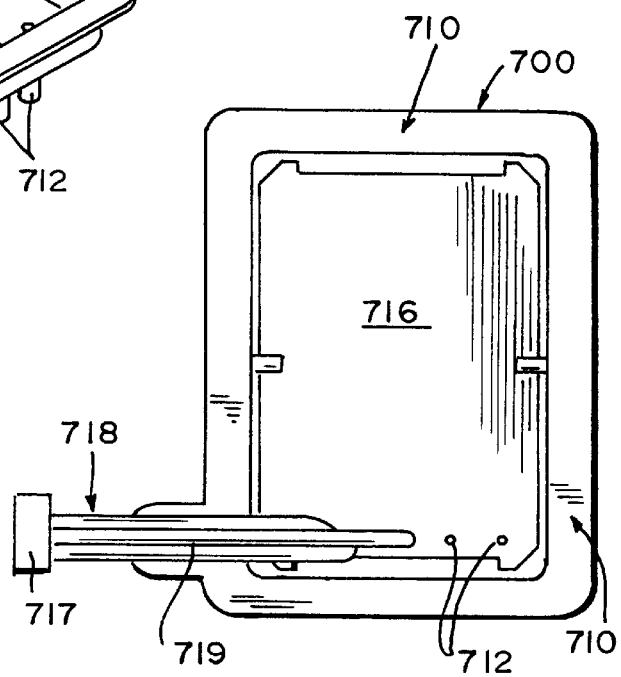
FIG. 23 is a side view of the power management module.
Figure 22:
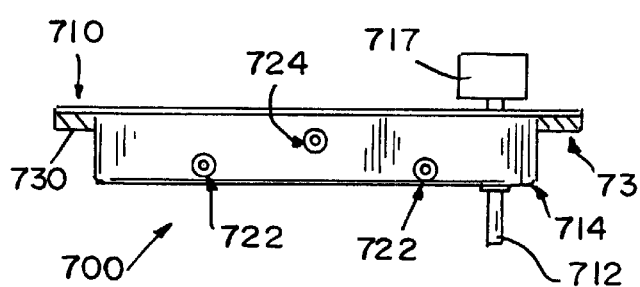
FIG. 22 is a plan view the power management module.

FIGS. 20–23 depict a power management module 700 configured to snugly fit into power management module compartment 420. The power management module 700 comprises a housing 710 and a circuit board 716. One face of the circuit board 716 is configured to receive source leads 712 from the battery. A wiring harness 719 in contact with an opposite face of the circuit board 716 carries leads away from the power management module and toward the functional control module FCM. Leads 718 terminate in a connector 717 to connect to connector 482 of the functional control module. The power management module 700 is equipped with pads 730. The pads 730 function to assist in creating an airtight seal as well as absorb vibration. The housing 710 includes protuberances 722 and 724. In FIG. 20, the protuberances are integral with the housing 710 and in FIGS. 21–22, they are post inserted from the exterior. The circuit board 716 is held between protuberances 722 and 724 displaced from the bottom of the housing 710. After installation of the power management module 700 into the power management module 410, the power management module may be potted on both the upper and lower surfaces of the circuit board 716. As depicted, the circuit board 716 is displaced from both edges of the power management module in order to allow space for the potting to get beneath the circuit board 716. The car control device will be exposed to varied environments, including varied temperatures. Accordingly, the power management module PMM is equipped with a temperature sensor in order to adjust the battery charging function as a function of temperature.

Figure 24:
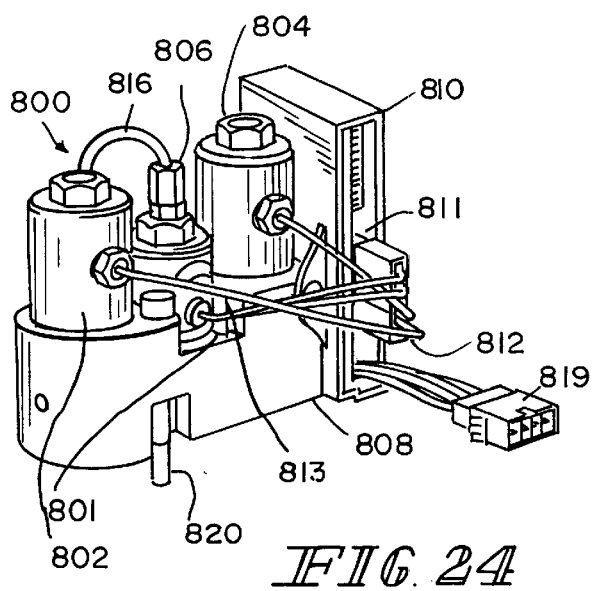
FIG. 24 is a perspective view of the control valve module in the stand alone configuration.
Figure 25:
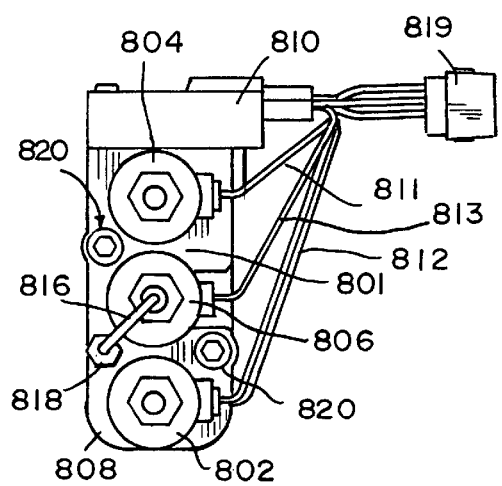
FIG. 25 is plan view of the control valve module submanifold in the stand alone configuration.
Figure 26:
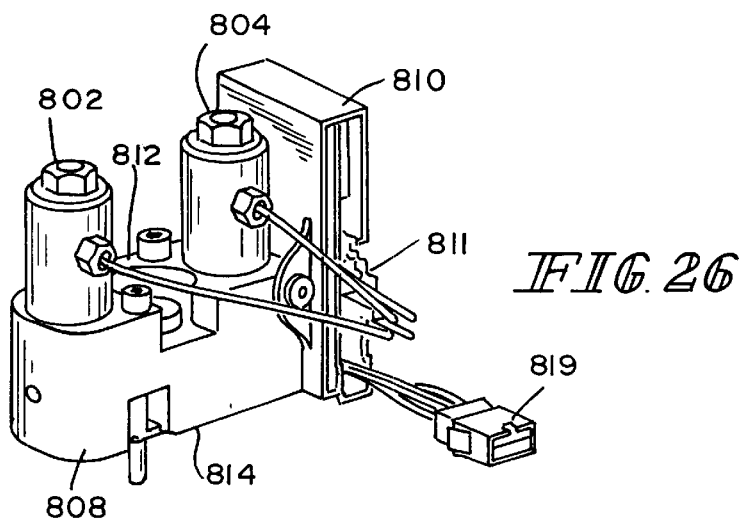
FIG. 26 is a perspective view of the control valve module in the overlay submanifold configuration.

The car control device further comprises a control valve module 800. Referring to FIGS. 24-26, a control valve module 800 comprises a supply valve 802 and an exhaust valve 804 as well as an electropneumatic isolator valve (EPI) 806. The supply valve 802 and exhaust valve 804 may be normally-closed analog proportional control valves, while the EPI 806 is a three way normally open digital valve. Each of the valves 802,804,806 is in electric communication with a circuit board assembly and terminal block 810 by leads 801,811,812.

A common submanifold provides the physical foundation for all of the elements of the control valve module 800. Specifically, each of the valves 802, 804 and 806 as well as the circuit board assembly 810 is mounted to the manifold 808. The submanifold contains pneumatic passages that allow air to be ported to and from within the control valve module 800. The valves and electronics are fastened to the submanifold. Each valve 802, 804, 806 is preferably held by one stud connector and nut. The manifold is fastened to a mating piece by self retained fasteners.

The Control Valve Module

The control valve module 800 is used in conjunction with a brake cylinder relay valve to control brake cylinder pressure for electropneumatic braking. The control valve module 800 reads and interprets electrical signals from the function control module via connector 819,477, and activates the appropriate proportional valve 802, 804 and EPI valve 806.

Electric leads extend from respective valves and mate with the circuit board assembly 810. Specifically, lead 812 extends from the supply valve 802; lead 811 extends from the exhaust valve 804, electrical lead 813 extends from the EPI valve 806. Additionally, the EPI valve 806 has a pneumatic lead 816 extending from the EPI valve 806 to the manifold 808. The pneumatic lead 816 is removably and sealably mounted to the manifold 808 by sealing connector 818. The manifold 808 is firmly and airtightly mounted to the manifold 403 by connectors 820.

The control valve module 800 is convertible from a stand-alone configuration as shown in FIGS. 24 and 25, to an overlay configuration as shown in FIGS. 26 and 27. In the overlay configuration, the EPI valve 806 is replaced by a plug 814. In addition, conversion to the overlay configuration requires removal of the pneumatic lead 816 and the sealing connector 818. The sealing connector is replaced with a plug 822. Also, a jumper wire 817 is installed at connector 819, which mates with connector 477, which extends from the edge connector 470. The invention further comprises detection software which determines whether the car control device is operating in the overlay configuration or alternatively in the stand-alone configuration from the presence of the jumper wire 817.

FIG. 28 shows an underside view of the control valve module 800 configured in the overlay mode. The bottom surface 824 of the control valve module 800 has a plurality of pneumatic ports in communication with the submanifold 808 and each of the respective valves 802, 804, 806 as well as a port configurable to communicate with a pilot operated valve 850 on the manifold 808. Specifically, the bottom surface 824 of the manifold 808 of the control valve module 800 bears an exhaust pneumatic port 832 in fluid communication with the exhaust valve 804, a pneumatic supply port 826 in fluid communication with the supply valve 802, a pneumatic EPI port 828 in fluid communication with the EPI valve 806, and output port 830 in fluid communication with the valves 802, 804, 806. The under surface 824 of the manifold 808 further comprises gaskets. These ports mate with ports (not shown) on the main manifold 486 at the control valve module compartment. The exhaust port 832 is connected through the pneumatic manifold exhaust. The supply port is connected through the pneumatic manifold 468 to the emergency reservoir. The electro-pneumatic isolator valve EPA port 830 is connected through the pneumatic manifold 468 to a pilot operated valve. The output port 830 is connected through the pneumatic manifold 468 to a pilot input of the brake cylinder relay valve BC. Note that jumper wire 817 is more readily viewable in FIGS. 27 and 28; this jumper wire is not present when the control valve module 800 is in the stand-alone configuration, as shown in FIGS. 24 and 25.

The Pressure Sensor Module

Figure 31:
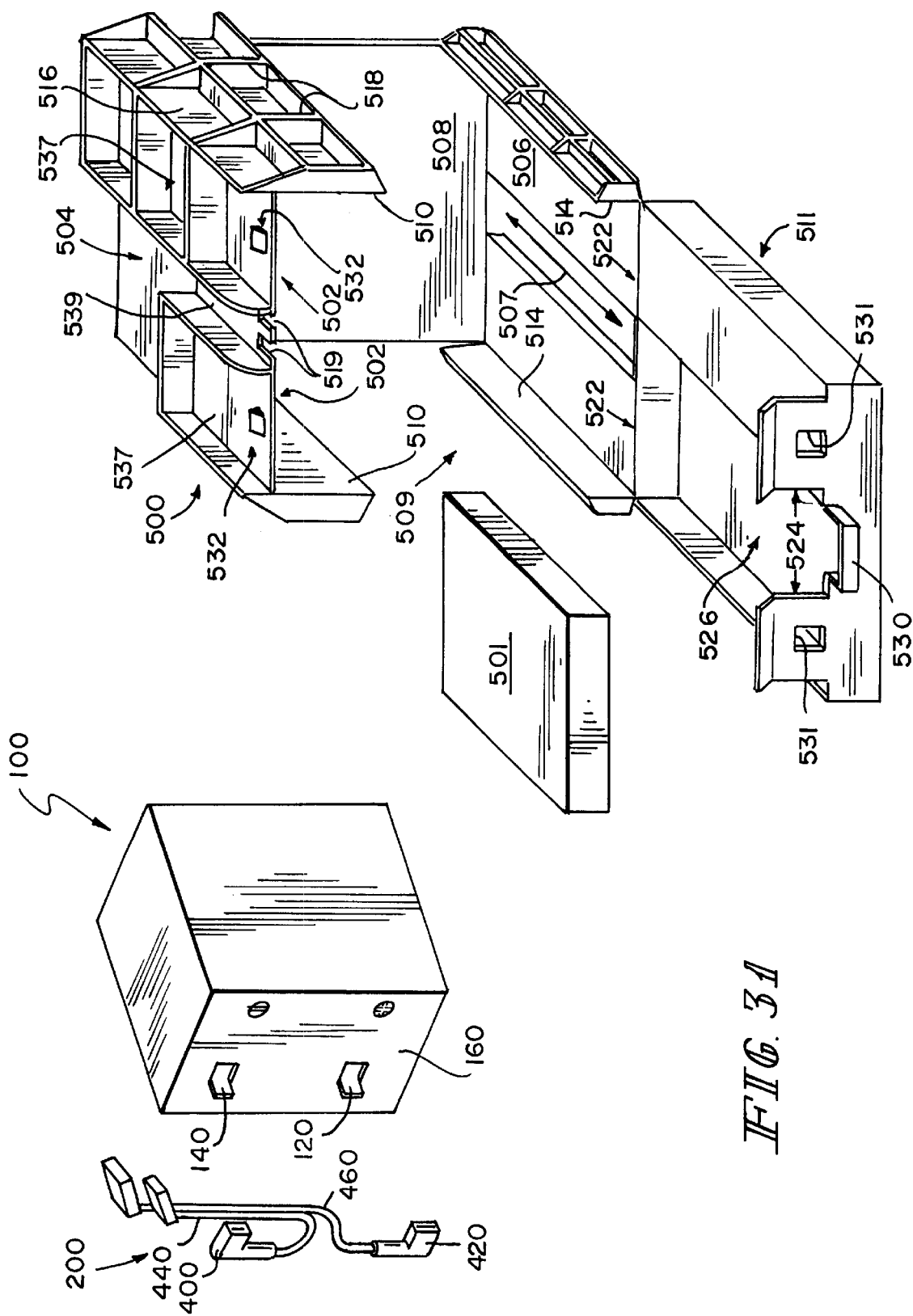
FIG. 31 shows an exploded view of the battery, battery connector, and battery carriage.

The car control device 400 will further comprise a pressure sensor module 852 as shown in FIGS. 29–31. In a car control device, a pressure sensor module receives pneumatic pressure signals from various ports of the manifold 468, and translates these pneumatic pressure signals to a functional control module, which interprets the electrical signals and decides whether to activate valves in order to control braking.

In the instant invention, the pressure sensor module 852 comprises a casing 854 securably mounted to the car control device housing 401 by fasteners 856 passing through extensors 859 on casting 854. Mounting of the pressure sensor module 852 to the housing 401 is accomplished with two self locking fasteners 856 into an interior region of the car control device housing 401. Because the pressure sensor module is preferably mounted in an interior area of the housing 401, a wrench clearance is an issue. In order to address the wrench clearance issue, the connectors 856 are preferably a hex head Allen screws configuration, as shown in FIG. 29. The Allen screw configuration enables mounting and dismounting using a simple Allen wrench. Additionally, the fasteners 856 are retained within apertures 857 to prevent loss and aiding assembly.

One face of the pressure sensor module 852, preferably atop face 858 has an electrical receptacle 860 thereon. The receptacle 860 electrically connects with and mates with connector 482. Electrical cable 480 extends from connector 482 to the functional control module FCM, particularly to the edge connector 470.

FIG. 30 shows another face, preferably the bottom face 862 of the pressure sensor module 852. The bottom face 862 has a plurality of pressure transducer ports 864. Each port is connected to a pressure transducer sealed in the casing 854. The transducers are electrically connected to the receptacle 860 by a printed circuit board. As previously described, the pressure transducers detect and measure the pressure at various points in the manifold 468, these points corresponding to respective pressures in the brake pipe BP, emergency reservoir ER, brake cylinder BC, and the output of the control valve CV. The bottom face 862 of the pressure sensor module 852 further comprises an atmosphere port 866, which provides a common pressure reference to each of the transducers in order to derive a voltage signal proportional to the gauge pressure sensed in each of the respective conduits of the manifold 468, because the casing is sealed onto the manifold 468.

It is important to determine gauge pressure because a locomotive will likely travel to various altitudes, where the atmospheric pressure may vary significantly. The atmosphere port 866 must be connected to the atmosphere; it can be conveniently placed on any face. As shown in FIG. 14, however, the atmosphere port 866 is connected to aperture 991 in the bottom 434 of the housing 401.

The disclosed pressure sensor module 852 is a significant improvement over the prior art. The prior art, as shown in FIGS. 2 and 3, used four separate transducers individually mounted and wired separately. As shown in FIGS. 2 and 3, the wiring involved four three pin connectors that each included two common connections, namely a positive supply and negative supply signal connection. Therefore, the prior art required at least twelve discreet wires to be connected to the controlling circuits. Additionally, each transducer required an atomospheric reference so that gauge pressure values could be determined and provided to the sensor circuits. This arrangement required a vented enclosure for the transducer, exposing the transducer and other components within the housing to moisture, dirt and other contaminants that may be in the air.

In contrast, the pressure sensor module 852 of FIGS. 29–31 is sealed and has a single mounting face with five ports configured on the mounting face. Four of the ports 864 contain pressure transducers connections, and the fifth port, preferably in the center, is an atmospheric vent 866. The vent 866 ported to this face provides an atmospheric reference for each of the four pressure transducers. The bottom face of the pressure transducer is configured such that, when properly installed, the ports 864, 866 automatically mate with and establish sealably pneumatic communication with the manifold 468 within the car control device housing 401.

The inventive pressure sensor module 858 is a significant improvement over the prior art pressure sensing assembly shown in FIGS. 2 and 3. First, the space requirement is significantly reduced because each of the transducers determines gauge pressure with respect to a common atmospheric vent 866. In the prior art, each of the transducers required a separate atmospheric reference. The prior art required a 12 pin connector in order to properly connect the four transducers. The configuration of the instant invention, simplifies the electronics and may be done with a six-pin connector.

Figure 37:
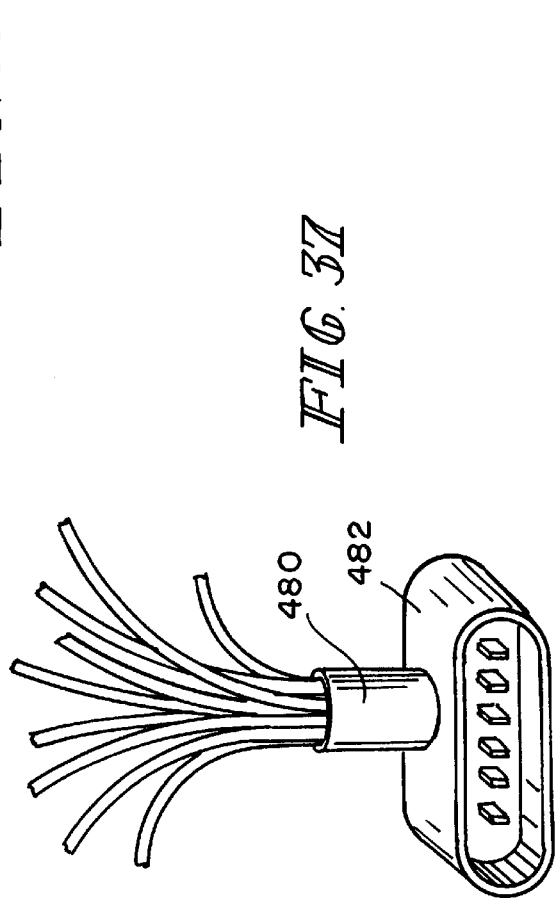
FIG. 37 is a perspective view of the power management module connector.

Wiring of the pressure sensor module 858 is simplified as well. As in FIG. 37, connector 482 is a six pin connector configured to mate with receptable 800. Four of the pins carry the signal from each of the four transducers, and two of the pins are a common plus and minus power source for each of the transducers. All of the electrical connections to the transducers is internal to the casing. This presents a significant improvement over the prior art, which required twelve discreet wires, as aforementioned.

The Battery Assembly

The car control device 400 further comprises a battery assembly as depicted in the exploded view in FIG. 31. The battery assembly comprises a battery 100 in the shape of general rectangular solid having a first face 160 with terminals 120, 140 spaced apart on the first face 160. The battery 100 may be configured with notches (not shown) in corners in order to prevent reversal of polarity of the battery. The battery assembly further comprises terminal connectors 420, 400 having leads 460 and 440, extending therefrom respectively. The leads 460,440 extend from the battery terminal connectors 420, 400 to the power management module PMM. As another safeguard against a reversal of polarity, the leads 460, 440 are made of differing lengths. Preferably, the lead 460, 440 are configured such that only one lead is long enough to reach the lower terminal 120.

The battery assembly further comprises a battery carriage 500. The battery carriage 500 is configured to tightly envelop the battery assembly. The battery carriage has a rear wall 508 as well as side walls 509, a top wall 502 and a front wall 511. In the embodiment shown, the side walls 509 comprise and upper flange 510 extending downward from the upper wall 502 as well as a lower flange 514 extending upward from the lower wall 506. Preferably, the front wall 511 shares an edge 522 with the lower wall 506; lower wall 506 is pivotally connected to front wall 511 about edge 522. The front wall further comprises a recessed area 526. The recessed area 526 is cooperatively configured to accommodate the battery connector assembly 200 when the front wall 511 is moved from the open position (as shown in FIG. 31) to the closed position. Padding 501 is positioned in recess 526.

The top wall 502 of the battery carriage 500 comprises two halves 537 which are spaced apart such that a surface 539 lies therebetween to form a byway for the current source leads. Wire clips 519 are configured adjacent the surface 539. The wire clips 519 retain and guide wires 440, 460 to the power management module 700 and contact source leads 712, which extend downward from the circuit board 716.

The front wall 511 will further comprise a guard member 530 configured on an upper edge. It extends up above the top wall and protects the leads 420, 460 where they come out of the battery connector. The upper edge of the front wall 511 will further comprise a pair of latch members 524. Each of these latch members 524 may comprise a hole 531 configured on the latch 524 such that when the front wall 511 is pivoted to the closed position, the hole 531 will engage a protuberance 532 configured on the upper wall 502.

The battery 100 and battery connector 200, as shown in the exploded view in FIG. 31, will snugly fit into the battery carriage 500, as shown in FIG. 32. The battery 100 and connector 200 are snugly retained by padding 501 as the door 511 is closed.

FIG. 34 shows how the fully assembled battery assembly, which includes the battery 100 and battery carriage 500 snugly nested within the battery carriage compartment 402 of the housing 401. Note that the profiling 518 along the upper flange 510 is significantly larger than the profiling 518 along the lower flange 514. Further note, that the recesses 404 configured in the battery carriage compartment 402 are similarly asymmetrically configured as well. As such, the cooperative configuration of the ribs 518 and profiling 404 prevents a battery from being wrongly inserted. If one attempts insert the battery carriage 500 into the battery carriage compartment 402 in a reversed (upside down) manner, the ribs 518 and profiling 404 will cooperate to prevent entry. This assures that the battery, once inserted, will have the proper orientation. Once the battery carriage 500, including the battery 100 is properly inserted into the battery carriage compartment 402, a cover 438 is installed onto the car control device 400. The cover is viewable in FIGS. 15, 16 and FIG. 34 as well.

Referring specifically to the embodiments shown in FIG. 33, the cover 438 comprises vent hole 437 on one of the faces, preferably the bottom face 439 of the battery compartment cover 438. The hole 437 and check valve 442 serve a very important purpose by preventing the build up of dangerous, flammable hydrogen gas inside the battery compartment 402 by allowing the gases to vent in the event pressure builds to a predetermined level. When pressure inside the battery compartment 402 increases to a predetermined level, the valve 442 open, allowing hydrogen and other flammable gases to escape the battery compartment.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A car control device for a car on an electric network of a train, the car control device communicating on the network, controlling pneumatic brakes on the car and charging a battery in a housing of the car control device, the car control device further comprising:

a pneumatic manifold integral to the housing, the manifold having a plurality of ports enabling fluid communication with a brake valve, and a control valve module; and, a functional control module in electric communication with a power management module, the control valve module, and the network, wherein the functional control module, power management module, and control valve module are interior the housing.

2. The car control device of claim 1, wherein the housing includes a battery compartment with top, bottom, back and side walls and a removable battery cover as a front wall;

the walls of the battery compartment being configured to receive the battery in a predetermined orientation;

a battery carriage having an internal configuration mating with the battery in the predetermined orientation and an external configuration mating with the walls of the battery compartment in the predetermined orientation.

3. The car control device of claim 2, wherein the carriage is configured to snugly envelope the battery and snugly lie in the battery compartment.

4. The car control device according to claim 2, wherein the carriage includes top, bottom, front, back and side walls, and the front wall of the carriage is pivotally connected near a first edge and latched adjacent a second edge.

5. The car control device according to claim 4, wherein the top, bottom and side walls of the carriage are configured to form legs of a U-shape with the back wall of the carriage as a bight of the U-shape.

6. The car control device as in claim 4, wherein the front wall of the battery carriage includes a recess area configured to receive the battery terminals in only one orientation of the battery to the battery carriage.

7. The car control device as in claim 4, including electrical leads connected to the battery terminal and extending from the battery carriage to the top wall of the battery compartment; and wire clips adjacent the top wall of the battery compartment receive the electrical leads.

8. The car control device of claim 7, wherein the front wall of the carriage includes a guard on a top edge of the front wall.

9. The car control device as in claim 2, wherein the bottom wall, back wall, and two side walls of the battery compartment are integrally configured with the housing to form a monolithic, one-piece structure, and the top wall of the battery compartment is sealably mounted to the housing.

10. The car control device as in claim 2, wherein the top wall of the battery compartment is configured to receive the power management module.

11. The car control device as in claim 2, wherein at least one of the side walls of the battery carriage comprises ribs on a outer surface, the ribs cooperatively configured with a profiling on side walls of the battery compartment, wherein the ribs snugly fit within the respective profiling in order to insure that the battery carriage and battery are inserted into the battery compartment in the predetermined orientation.

12. The car control device as in claim 2, wherein the battery compartment further comprises a pressure release valve which allows gas to escape the housing in the event pressure inside the battery compartment elevates to a predetermined level.

13. The car control device as in claim 1, wherein the housing and the manifold are a monolithic, one-piece structure, with removable covers, made of cast aluminum.

14. A car control device for a car on an electric network of a train, the car control device communicating on the network, controlling pneumatic brakes on the car and charging a battery in a housing of the car control device, the car control device further comprising:

a pneumatic manifold integral to the housing, the manifold having a plurality of ports enabling fluid communication with a brake valve, and a control valve module;

a functional control module in electric communication with a power management module, the control valve module, and the network;

the power management module being mounted in the housing and forming a top wall of a battery compartment; and battery leads extend from the power management module into the battery compartment and are connected to terminals of the battery.

15. The car control device according to claim 14, wherein source leads extend from the power management module exterior the battery compartment and are connected to the functional control module.

16. The car control device according to claim 14, wherein the battery and source leads are connected to the power management module interior to the power management module.

17. The car control device according to claim 14, wherein the power management module includes a housing, a circuit board mounted in the housing, and circuitry on the circuit board.

18. The car control device as in claim 17, wherein the battery and source leads attach to a surface of the circuit board of the power management module.

19. The car control device as in claim 18, wherein the circuit board is potted on both sides.

20. The car control device of claim 14, wherein the power management module further includes a battery charger.

21. The car control device as in claim 14, further comprising a gasket between the power management module and the housing.

22. The car control device as in claim 14, wherein the power management module comprises a frame, protuberances in the frame positioned to engage a circuit board, the circuit board displaced from a bottom of the housing and the circuit board is potted on both sides.

23. A car control device for a car on an electric network of a train, the car control device communicating on the network, controlling pneumatic brakes on the car and charging a battery in a housing of the car control device, the car control device further comprising:

a pneumatic manifold integral to the housing, the manifold having a plurality of ports enabling fluid communication with a brake valve, and a control valve module;

a functional control module in electric communication with a power management module, the control valve module, and the network;

the housing including a cover providing access to the manifold; and the functional control module being mounted on an interior surface of the cover.

24. A car control device as in claim 23, further comprising a functional control module compartment integrally configured on a face of the housing; the cover removably conceals the functional control module compartment; and the functional control module lies in the functional control module compartment and comprises circuitry which interprets trainline communications signals, provides brake control signals to a control valve module, and provides control to a power management module, which charges the battery.

25. The car control device as in claim 24, further comprising a plurality of fluid ports on the manifold and accessible from the functional control module compartment.

26. The car control device of claim 23, wherein the functional control module comprises:

a circuit board mounted adjacent to the interior surface of the cover;

first electrical leads electrically connecting the circuit board to the power management module;

second electrical leads electrically connecting the circuit board to the control valve module;

third electrical leads electrically connecting the circuit board to a pressure sensor module; and fourth electric leads electrically connecting the circuit board to plugs on the housing, the plugs removably receiving leads connected to the network.

27. The car control device of claim 26, further comprising a pair of parallel, spaced apart, groove members attached to the interior surface of the cover, thereby forming a channel to receive longitudinal edges of the functional control module circuit board.

28. The car control device of claim 26, further comprising:

an edge connector mates with an edge of the circuit board; and the first, second, third, and fourth electrical leads each electrically contact the circuit board by extending from the edge connector.

29. The car control device as in claim 28, wherein the edge connector is mounted on the interior surface of the cover and positioned such that as the circuit board is inserted into the channel, the edge connector provides a stop to electrically engage the circuit board.

30. The car control device as in claim 26, further comprising at least one locking device securing the circuit board in the channel.

31. The car control device as in claim 23, further comprising a support structure configured to cooperate with the housing to support the cover on the housing in an open position of the cover.

32. The car control device as in claim 31, wherein the support structure comprises at least one support member mounted on the cover, each support member extending into the housing when the functional control module cover is in a closed position.

33. The car control device as in claim 32, wherein each support member is configured to engage a respective recess in the housing when the functional control module cover is moved to the open position.

34. The car control device as in claim 1, further comprising a brake cylinder valve mounted to the manifold on one face of the housing, the brake cylinder valve selectively connects and disconnects the emergency reservoir to a pneumatic valve.

35. The car control device as in claim 1, further comprising a brake cylinder test port on the housing.

36. The car control device of claim 1, wherein the control valve module has supply and exhaust valves on a submanifold, and an electric connector block;

the supply and exhaust valves are electrically connected to the connector block, and the connector block is connected to the functional control module; and the submanifold is mounted on the manifold, and the control valve module is in fluid communication with a pipe bracket and the brake valve.

37. The car control device as in claim 36, including a control valve module compartment on a face of the housing for the control valve module, the control valve module compartment is adjacent a power management module compartment in the housing for the power management module; and, a common cover on the housing provides access to both the power management module compartment and the control valve module compartment.

38. The car control device as in claim 37, wherein the sub-manifold includes ports for the supply valve, the exhaust valve, and an isolation valve; and the supply valve and the exhaust valve are mounted in the supply valve and the exhaust valve ports, respectively.

39. The car control device as in claim 38, wherein the isolation valve is mounted in the isolation valve port in a stand alone configuration of the car control device and is removed for an overlay configuration of the car control device.

40. The car control device as in claim 39, wherein the isolation valve is electrically connected to the connector block in the stand-alone configuration.

41. The car control device as in claim 39, further comprising a jumper wire electrically connected to the electrical connector block when the car control device is in an overlay configuration; and,
    the car control device further comprises detection software which determines whether the car control device is operating in the overlay configuration or alternatively in the stand-alone configuration from the jumper wire.

42. The car control device as in claim 36, further comprising electrical leads electrically connecting each of a respective supply valve and the exhaust valve to the connector block; and a multi-lead wiring harness connecting the connector block to the functional control module.

43. The car control device as in claim 1, further comprising:
    a pressure sensor module compartment in the housing; and
    a pressure sensor module mounted in the pressure sensor module compartment, in fluid communication with the manifold, and in electric communication with the functional control module.

44. The car control device as in claim 43, wherein the pressure sensor module further comprises:
    a casing;
    a plurality of pneumatic input ports on a first face of the casing and in fluid communication with the manifold;
    the ports are configured so that mounting of the pressure sensor module to the housing sealably connects each of the pneumatic input ports to an aperture in fluid communication with the manifold; and
    a plurality of transducers inside the casing and in communication with its own port.

45. The car control device as in claim 44, wherein the casing is sealed except for the ports.

46. The car control device as in claim 44, wherein the pneumatic input ports are connected respectively to receive fluid communication from a reservoir, a brake pipe, a brake cylinder and the control valve module and an external atmosphere port, and each transducer is connected to a respective port and the external atmosphere port.

47. The car control device as in claim 44, further comprising a multi-pin electrical receptacle on a second face of the casing; and wherein,
    each of the transducers having an output electrically connected to a respective pin and an input electrically connected to a pair of common voltage input pins.

48. The car control device as in claim 47, further comprising cable configured to mate with the receptacle on the first end and electrically contacts the functional control module at a second end.

49. The car control device as in claim 44, wherein the casing comprises at least one bore for receipt of a fastener which attaches the casing to the housing.

50. The car control device as in claim 43, wherein the pressure sensor module forms a pneumatic seal when mounted onto the housing.

51. The car control device as in claim 43, wherein the pressure sensor module is mounted inside the housing adjacent the control valve module.

52. The car control device as in claim 1, further comprising:
    a plurality of adjacent ports on an exterior of a wall of the housing configured to mate with a release portion of a pneumatic brake control valve;
    a release portion of a pneumatic brake control valve is mounted at the exterior wall and mates with the adjacent ports in a stand alone configuration of the car control device; and
    an overlay module is mounted at the exterior wall and mates with the adjacent ports in an overlay configuration of the car control device.

53. The car control device as in claim 52, wherein the overlay module includes an electropneumatic valve electrically connected to the function control module and pneumatically connected to the brake control valve.

54. The car control device as in claim 53, wherein the electropneumatic valve selectively connects the pneumatic brake control valve or the car control device to control a brake cylinder.

55. The car control device as in claim 52, wherein the overlay module includes an electropneumatic valve and a pneumatic valve;
    the electropneumatic valve receiving control signals to selectively connect reservoir or exhaust to control the pneumatic valve; and
    the pneumatic valve connects the brake control valve to the brake cylinder in response to exhaust and connects the car control device to the brake cylinder in response to reservoir pressure.

56. The car control device as in claim 52, further comprising a plug removably inserted into a pneumatic valve port in the functional control module compartment when the car control device is in the overlay configuration, and inserted into a pneumatic valve port in the overlay assembly when the car control device is in the stand alone configuration.

57. The car control device as in claim 52, wherein the electropneumatic valve is removably mounted on the control valve module when the car control device is in the stand-alone configuration, and is replaced by a plug in the control valve module when the car control device is in the overlay configuration.

58. The car control device as in claim 52, further comprising a special port to selectively receive one of a pair of special plugs, the pair comprising a stand-alone plug which is configured to allow fluid communication between an emergency reservoir and an auxiliary reservoir and an overlay plug which is configured to prevent fluid communication between the auxiliary reservoir and the emergency reservoir.

59. The car control device as in claim 58, wherein the special port is on a pipe bracket interface.

60. A car control device for a car on an electric network of a train, the car control device communicating on the network, controlling pneumatic brakes on the car and charging a battery in a housing of the car control device, the car control device further comprising:

a pneumatic manifold integral to the housing, the manifold having a plurality of ports enabling fluid communication with a brake valve, and a control valve module;

a functional control module in electric communication with a power management module, the control valve module, and the network;

a plurality of compartments in the housing accessible through openings on at least two faces of the housing;

a removable cover for each of the opening on the housing for separate accessibility to the compartments;

the functional control module, power management module and control valve module being separately mounted a respective compartment.

61. The car control device as in claim 59, wherein the power management module, the control valve module, and a pressure sensor module are in adjacent compartments in the housing, and the compartments share a common face of the housing.

* * * * *

UNITED STATES PATENT AND TRADEMARK OFFICE
CERTIFICATE OF CORRECTION

PATENT NO. : 6,472,769 B1
DATED : October 29, 2002
INVENTOR(S) : Abraham Long, Jr. et al.

It is certified that error appears in the above-identified patent and that said Letters Patent is hereby corrected as shown below:

Column 7,
Lines 45-46, delete ", viewed from plane BB shown on FIG. 15."

Column 22,
Line 32, after "compartment," insert -- to --.
Line 35, after "front wall," insert -- of the carriage --.
Line 41, change "the top" to -- at least one side --.
Line 49, change "insure" to -- ensure --.

Column 24,
Line 19, change "mates" to -- mating --.
Line 49, change "the emergency reservoir" to -- an emergency reservoir --.

Column 25,
Line 26, change "the exhaust valve" to -- exhaust valve --.
Line 42, change "the ports" to -- the pneumatic input ports --.
Line 47, change "its own port" to -- its own pneumatic input port --.
Line 49, change "the ports" to -- the pneumatic input ports --.
Line 55, change "respective port" to -- respective pneumatic input port --.
Line 63, insert -- a -- before "cable".
Lines 63-64, change "the first end and electrically contacts" to -- a first end and electrically conctact --.

Column 26,
Lines 13 and 16, change "the exterior wall" to -- the exterior of the wall of the housing --.
Lines 22 and 33, insert -- pneumatic -- before "brake control valve".
Line 44, change "claim 52" to -- claim 53 --.

Signed and Sealed this

First Day of June, 2004

JON W. DUDAS
*Acting Director of the United States Patent and Trademark Office*